US012659656B2

(12) United States Patent
Hook

(10) Patent No.: US 12,659,656 B2
(45) Date of Patent: Jun. 16, 2026

(54) SYSTEMS AND METHODS FOR MICROPHONE SENSOR SYSTEMS FOR A VEHICLE EXTERIOR

(71) Applicant: Valeo Telematik und Akustik GmbH, Friedrichsdorf (DE)

(72) Inventor: Brandon S. Hook, Friedrichsdorf (DE)

(73) Assignee: Valeo Telematik und Akustik GmbH (DE)

( * ) Notice: Subject to any disclaimer, the term of this patent is extended or adjusted under 35 U.S.C. 154(b) by 183 days.

(21) Appl. No.: 18/593,503

(22) Filed: Mar. 1, 2024

(65) Prior Publication Data

US 2025/0280231 A1 Sep. 4, 2025

(51) Int. Cl.

| | |
|---|---|
| ***H04R 3/00*** | (2006.01) |
| ***H04R 1/40*** | (2006.01) |
| ***H04R 3/04*** | (2006.01) |
| ***H04R 29/00*** | (2006.01) |

(52) U.S. Cl.

CPC ............. *H04R 3/005* (2013.01); *H04R 1/406* (2013.01); *H04R 3/04* (2013.01); *H04R 29/005* (2013.01); *H04R 2410/01* (2013.01); *H04R 2410/07* (2013.01); *H04R 2430/01* (2013.01); *H04R 2499/13* (2013.01)

(58) Field of Classification Search

CPC .......... H04R 3/005; H04R 1/406; H04R 3/04; H04R 29/005; H04R 2410/01; H04R 2410/07; H04R 2430/01; H04R 2499/13

See application file for complete search history.

(56) References Cited

U.S. PATENT DOCUMENTS

| | | | | |
|---|---|---|---|---|
| 11,290,814 | B1 * | 3/2022 | Hook | G10L 21/0232 |
| 11,303,994 | B2 | 4/2022 | Hook | |
| 2012/0020485 | A1 * | 1/2012 | Visser | H04R 5/033<br>381/57 |
| 2021/0014605 | A1 * | 1/2021 | Hook | H04R 1/326 |
| 2021/0204059 | A1 * | 7/2021 | Trestain | H04R 3/005 |

* cited by examiner

*Primary Examiner* — Yogeshkumar Patel

(74) *Attorney, Agent, or Firm* — Dickinson Wright PLLC

(57) ABSTRACT

A method includes receiving location information of a user device; receiving a first and second microphone signals corresponding to an acoustic stimulus and a non-acoustic stimulus; processing the first and second microphone signals based on the location information of the user device; generating a first and second compensated signals and an average signal corresponding to an average of the first and second compensated signals; responsive to the determining that an instantaneous magnitude of a first signal is greater than that of a second signal, generating an output audio signal by switching or cross fading between a beamformed signal and an alternative signal such that a contribution of the alternative signal to the output audio signal is increased and a contribution of the beamformed signal to the output audio signal is decreased.

18 Claims, 25 Drawing Sheets

SYSTEMS AND METHODS FOR MICROPHONE SENSOR SYSTEMS FOR A VEHICLE EXTERIOR

TECHNICAL FIELD

The present disclosure relates to microphone capsules, and in particular to systems and methods for detecting speech external to a vehicle using microphone capsules in a microphone array.

BACKGROUND

Vehicles, such as cars, trucks, sport utility vehicles, crossover vehicles, mini-vans, all-terrain vehicles, recreational vehicles, watercraft vehicles, aircraft vehicles, or other suitable vehicles are increasingly utilizing microphone capsules and/or microphone arrays for sound detection, such as speech detection, and the like. Such microphone capsules may be disposed on the exterior and/or in the interior of a vehicle and may be susceptible to sound wave exposure variance (e.g., due in part to a physical arrangement of the microphone capsules in a microphone array and/or physical and/or electrical characteristic variances between the microphone capsules) and/or noise, such as wind and the like.

SUMMARY

An aspect of the disclosed embodiments includes a method that includes: receiving sensor data indicating location information of a user device; receiving a first microphone signal generated based on a response of a first microphone in a microphone array to an acoustic stimulus and a non-acoustic stimulus; receiving a second microphone signal generated based on a response of a second microphone in the microphone array to the acoustic stimulus and the non-acoustic stimulus; generating a beamformed signal by combining the first microphone signal and the second microphone signal using differential beamforming; adjusting the first microphone signal based on the location information of the user device; adjusting the second microphone signal based on the location information of the user device; generating a first compensated signal based on the adjusted first microphone signal; generating a second compensated signal based on the adjusted second microphone signal; generating an average signal corresponding to an average of the first compensated signal and the second compensated signal; detecting a presence of the non-acoustic stimulus in the first compensated signal and the second compensated signal, by: comparing a first signal to a second signal, wherein the first signal is at least one of the beamformed signal and a signal derived from the beamformed signal, and wherein the second signal is at least one of the average signal and a signal derived from the average signal; and determining, based on a result of the comparing, that an instantaneous magnitude of the first signal is greater than that of the second signal; and, responsive to the determining that the instantaneous magnitude of the first signal is greater than that of the second signal, generating an output audio signal by switching or cross fading between the beamformed signal and a noise-reduced signal such that a contribution of the noise-reduced signal to the output audio signal is increased and a contribution of the beamformed signal to the output audio signal is decreased.

Another aspect of the disclosed embodiments includes a system that includes a processor and a memory. The memory includes instructions that, when executed by the processor, cause the processor to: receive sensor data indicating location information of a user device; receive a first microphone signal generated based on a response of a first microphone in a microphone array to an acoustic stimulus and a non-acoustic stimulus; receive a second microphone signal generated based on a response of a second microphone in the microphone array to the acoustic stimulus and the non-acoustic stimulus; generate a beamformed signal by combining the first microphone signal and the second microphone signal using differential beamforming; adjust the first microphone signal based on the location information of the user device; adjust the second microphone signal based on the location information of the user device; generate a first compensated signal based on the adjusted first microphone signal; generate a second compensated signal based on the adjusted second microphone signal; generate an average signal corresponding to an average of the first compensated signal and the second compensated signal; detect a presence of the non-acoustic stimulus in the first compensated signal and the second compensated signal, by: comparing a first signal to a second signal, wherein the first signal is at least one of the beamformed signal and a signal derived from the beamformed signal, and wherein the second signal is at least one of the average signal and a signal derived from the average signal; and determining, based on a result of the comparing, that an instantaneous magnitude of the first signal is greater than that of the second signal; and, responsive to the determining that the instantaneous magnitude of the first signal is greater than that of the second signal, generate an output audio signal by switching or cross fading between the beamformed signal and a noise-reduced signal such that a contribution of the noise-reduced signal to the output audio signal is increased and a contribution of the beamformed signal to the output audio signal is decreased.

Another aspect of the disclosed embodiments includes a computer-readable storage medium containing instructions that, when executed by one or more processors of a computer, cause the one or more processors to: receive sensor data indicating location information of a user device; receive a first microphone signal generated based on a response of a first microphone in a microphone array to an acoustic stimulus and a non-acoustic stimulus; receive a second microphone signal generated based on a response of a second microphone in the microphone array to the acoustic stimulus and the non-acoustic stimulus; generate a beamformed signal by combining the first microphone signal and the second microphone signal using differential beamforming; adjust the first microphone signal based on the location information of the user device; adjust the second microphone signal based on the location information of the user device; generate a first compensated signal based on the adjusted first microphone signal; generate a second compensated signal based on the adjusted second microphone signal; generate an average signal corresponding to an average of the first compensated signal and the second compensated signal; detect a presence of the non-acoustic stimulus in the first compensated signal and the second compensated signal; and generate an output audio signal by one of switching and cross fading between the beamformed signal and a noise-reduced signal such that a contribution of the noise-reduced signal to the output audio signal is increased and a contribution of the beamformed signal to the output audio signal is decreased.

These and other aspects of the present disclosure are disclosed in the following detailed description of the embodiments, the appended claims, and the accompanying figures.

BRIEF DESCRIPTION OF THE DRAWINGS

The disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION

Figure 1:
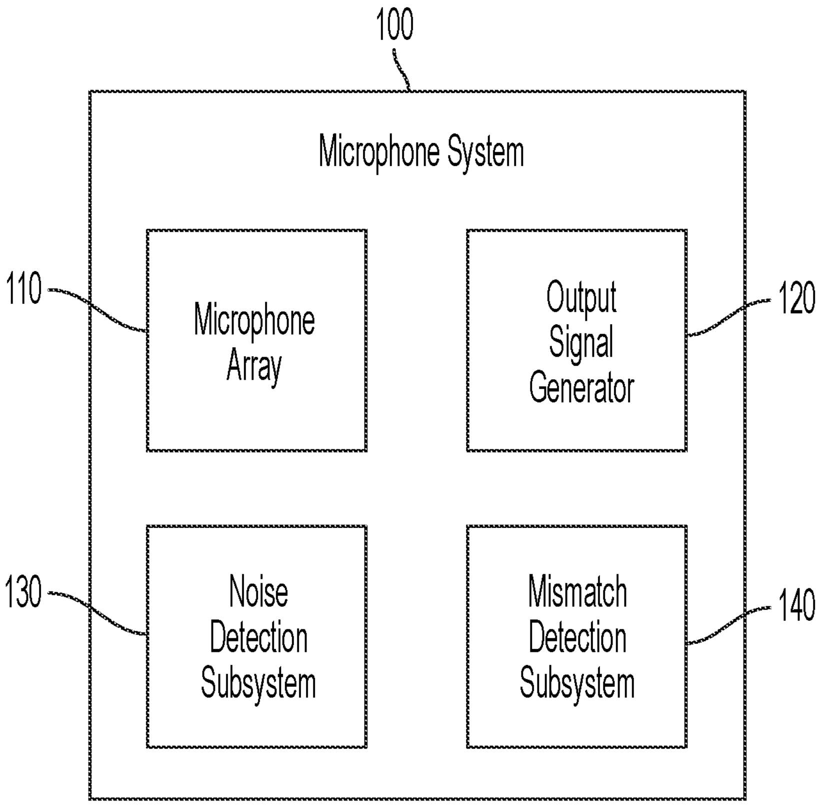
FIG. 1 is a simplified block diagram of a microphone system according to certain embodiments.

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Embodiments are described with respect to omnidirectional microphones, but are also applicable to directional microphones. Further, the embodiments are not limited to any particular type of microphone. For instance, the embodiments can be applied to MEMS (Micro-Electro-Mechanical Systems) based microphones, capacitor/condenser microphones, piezoelectric microphones, and ribbon microphones.

As described, vehicles, such as cars, trucks, sport utility vehicles, crossover vehicles, mini-vans, all-terrain vehicles, recreational vehicles, watercraft vehicles, aircraft vehicles, or other suitable vehicles are increasingly utilizing microphone capsules and/or microphone arrays for sound detection, such as speech detection, and the like. Such microphone capsules may be disposed on the exterior and/or in the interior of a vehicle and may be susceptible to sound wave exposure variance (e.g., due in part to a physical arrangement of the microphone capsules in a microphone array and/or physical and/or electrical characteristic variances between the microphone capsules) and/or noise, such as wind and the like.

Accordingly, systems and methods such as the systems and methods described herein, may be configured to detect and reduce noise in an audio signal, produced in response to non-acoustic stimuli, and generated using a microphone array (e.g., an array of microphones spaced apart along a linear axis). Non-acoustic stimuli can include wind striking the microphones in the microphone array from various angles and at various speeds. Another example of non-acoustic stimuli can be someone touching, or otherwise coming into contact with, one or more of the microphones in the microphone array. It is usually desirable for a microphone array to be insensitive to non-acoustic stimuli. In contrast, sensitivity to some but not all acoustic stimuli is generally desirable. For example, speech from a talker is usually a desirable acoustic stimulus, whereas speech from a competing talker may not be a desirable acoustic stimulus. For an array with an objective to capture speech from a talker, examples of undesirable acoustic stimuli include, but are not limited to, road and tire noise, fan noises, honking horns, keys jingling, animal or other biological sounds, television sounds in the background, and music from a radio.

In a microphone array, signals produced by two or more microphones can be combined to form an output audio signal. For instance, the output audio signal can be generated through beamforming, which may involve introducing a time delay to one or more microphone signals so as to take advantage of the spatial relationship between the microphone capsules. Beamforming can be used, for example, to programmatically design a directional pickup response by exploiting the unique phase information captured by omnidirectional microphones. Beamforming enables the polar pattern of the microphone array's overall response to be shaped in many different ways, including cardioid, hypercardioid, figure-8, generic, time-variant, etc.

Aspects of the present disclosure also relate to calibrating a system with a microphone array in order to compensate for mismatched microphones. In a microphone array, the responses of the individual microphones should ideally be the same in order to permit accurate beamforming. Mismatches due to variations in microphone components, such as the transducers that convert acoustic energy into electrical signals, are typically handled through gain calibration at the time of manufacture. Transducer assemblies are usually referred to as microphone capsules. Capsules generally include a diaphragm that vibrates in response to sound and electrical components that convert the vibration of the diaphragm into an electrical signal. In the present disclosure, the terms “capsule” and “microphone” are sometimes used interchangeably since the behavior of a microphone is dictated by its capsule. Once a capsule has been fully enclosed (e.g., placed into a housing, with a grille and a foam windscreen) the response of the capsule now includes the acoustic path through said enclosure (e.g., housing), which is good to measure, but at this stage in production processes it becomes prohibitive to use conventional gain calibration because electrical components (e.g., gain-trimming resistors) cannot be added or removed. Alternatively, for microphones assemblies which include onboard memory and signal processing, it is possible to store the results of measurements in memory so that calibration can be applied digitally. However, this does not address the fact that microphone sensitivities can change over time, and at different rates for different frequencies.

In a microphone array, sound which is to be captured (e.g., a user’s voice) causes the microphones to produce signals that are correlated with each other since each microphone captures the same sound and responds to the sound in substantially the same manner. This assumes that the microphones are matched, e.g., they have the same frequency response and sensitivity. This also assumes the microphones are spaced close to each other. A large spacing between microphones in the array reduces the similarity of what they experience at frequencies whose wavelength is longer than the spacing. If the microphones are matched, then signals produced by the microphones in response to a sound source that is equidistant from and facing the same direction toward each of the microphones will be substantially identical in the time domain.

Non-acoustic stimuli can introduce noise into the output of a beamformer. A major source of such noise is wind buffeting, which almost invariably presents itself at different microphones in different ways. Wind impinging on a microphone in a microphone array will almost never impinge upon another microphone in the same array with the same intensity at the same time. This reduces the degree of correlation between signals produced by the microphones in response to this non-acoustic stimuli. The output audio signal produced by combining the microphone signals will therefore include a mixture of composition that corresponds to non-acoustic stimuli (e.g., wind gusts) and acoustic stimuli (e.g., speech, ambient acoustic noise). The effects of such noise are exacerbated due to the fact that some beamformer topologies include a post-filter or stage that amplifies uncorrelated signals. There are other non-acoustic stimuli which can cause uncorrelated signals and which are often encountered during use of a microphone array. For instance, noise may be introduced as a result of a user scratching on a microphone cover or handling the assembly in which the microphone array is housed.

In some embodiments, the systems and methods described herein may be configured to detect voice commands from a user (e.g., vehicle key fob, or other suitable device, holder), while reducing or eliminating noise and wind associated with noisy and windy environments of the user, which cause the signal-to-noise ratio to deteriorate when trying to detect the user voice commands.

In some embodiments, the systems and methods described herein may be configured to reduce wind sensitivity in the microphone array and/or to direct the beampattern of the exterior microphone array toward the speaking user. The systems and methods described herein may be configured to reduce distortion of the voice command signal while reducing wind and/or other unwanted noise. For example, the systems and methods described herein may be configured to receive location information from one or more sensors (e.g., which may include ultra wide band anchors and/or any other suitable sensor, including, but not limited to, image capturing sensors, lidar, ultrasonic sensor systems, and the like) to determine and/or identify a location of a user device associated with the user (e.g., who may also be an owner of the vehicle) with high accuracy. The user device may include any suitable device including at least one of a key fob, mobile computing device (e.g., such as a smart phone, tablet, music player, and/or the like), digital tag (e.g., such as a relatively small device having communication capabilities and configured to identify a location of the digital tab), a smart card (e.g., a card programmed to unlock and/or start the vehicle), and/or any other suitable user device. The user device may be held by or otherwise on the person of the user. As such, the location of the user device may be used to identify the user, and, accordingly, speech associated with the user (e.g., such as voice commands and/or the like). The location information may include a location and angle of the user device relative to the microphone array.

In some embodiments, the exterior microphone array can be directed toward the user providing the voice commands, while simultaneously reducing wind noise and other unnecessary sounds in the outside environment. The systems and methods described herein may be configured to scale a beamwidth of the exterior microphone array in accordance with a relative distance and angle of the user device with respect to the location of the vehicle exterior microphones, while reducing the sensitivity to the unwanted signals from the noisy and windy environment. The systems and methods described herein may be configured to, using the location information of the user device, add delays appropriately to each capsule of the microphone array, such that all received signals are in phase relative to the voice command location (e.g., such that each capsule receives the voice signal at the same time).

FIG. 1 is a simplified block diagram of a microphone system 100 according to certain embodiments. The system 100 includes a microphone array 110, an output signal generator 120, a noise detection subsystem 130, and a mismatch detection subsystem 140. The system 100 is not limited to any particular operating environment. In some implementations, the system 100 comprises at least some components that are located on-board a vehicle, e.g., a motor vehicle. For instance, the system 100 may be used to implement an in-vehicle public announcement system or in-car communication system. Additionally, the system 100 can be implemented using software or a combination of hardware and software. Functionality described below with respect to circuit implementations of the output signal generator 120, the noise detection subsystem 130, or the mismatch detection subsystem 140 can be implemented through instructions executed on one or more processors of a computer system. For example, the one or more processors may perform functions of the systems and methods described herein by executing instructions stored on a memory that, when executed by the one or more processors, cause the one or more processors to perform the functions of the systems and methods described herein.

Microphone array 110 comprises a plurality of microphones arranged in a specific physical configuration. For instance, the microphone array 110 may include two or more omnidirectional microphones arranged sequentially along a linear axis, with a certain distance between each pair of adjacent microphones, in what is known as an endfire configuration. In an endfire configuration, if a sound source is closer to one end of the microphone array, sound from the source will be captured by each microphone at different times, with the microphone that is closest to the source being the first microphone to capture the sound. However, if the source is equidistant from the microphones (e.g., facing broadside), then the sound from the source will be captured simultaneously by each microphone in the array.

Output signal generator 120 is configured to generate an output audio signal by combining signals from two or more microphones in the microphone array 110. The output audio signal generated by the output signal generator 120 can be output over a loudspeaker (e.g., over an in-vehicle speaker), stored for subsequent use (e.g., as an audio recording for later playback) or subjected to downstream processing.

In certain embodiments, the output signal generator 120 includes a beamformer configured to control the response of the microphone array 110 through beamforming. For instance, the beamformer may introduce a time delay into one or more microphone signals so that the microphone signals have a certain phase relationship when the microphone signals are combined (e.g., summed together or subtracted from each other) to form the output audio signal. The beamforming creates nulls in certain directions, resulting in a desired polar pattern for the microphone array 110. In some embodiments, the beamformer is a differential beamformer that generates the output audio signal based on a difference between two or more microphone signals.

As indicated above, a post-filter in a beamformer can amplify signals that are produced in response to non-acoustic stimuli. For instance, post-filters for differential beamformers may apply increasing gain inversely proportional to frequency. Such amplification is performed in order to compensate for the fact that signals from different microphones become increasingly dissimilar at higher frequencies. In general, for a microphone array using differential beamforming, the beamforming post-filter adds a significant signal boost inversely proportional to the frequency due to the expectation that acoustic signals are highly correlated between two closely-spaced microphones. Since the difference between two closely-spaced microphone's signals is very close to zero for the lowest frequencies, it makes sense to use this boost to restore the on-axis response to acoustic stimuli. However, non-acoustic stimuli (e.g., wind, physical handling) produce signals in these closely-spaced microphones whose difference is considerably greater by comparison. Further, since differential beamforming works on the acoustic sound pressure gradient between microphone capsules, microphone signals that are uncorrelated with each other have a large magnitude after the differential of the microphone signals is calculated. For instance, during a wind event, the magnitude of a beamformed signal output by a differential beamformer can be greater than ten times that of any individual microphone signal used to generate the beamformed signal. This may be a large price to pay for the benefits of high directivity index and a frequency invariant polar pattern. Any benefit as mentioned is immediately traded off during moments when the microphone array encounters a stimuli which produces signals on the outputs of each microphone capsule which are uncorrelated with each other.

The output signal generator 120 may further be configured to adjust the output audio signal in response to the noise detection subsystem 130 detecting wind or other non-acoustic stimuli. For instance, as discussed below, in certain embodiments, the output audio signal is generated by switching between the output of a beamformer when a non-acoustic stimulus has not been detected and the output of a noise reduction circuit when a non-acoustic stimulus has been detected.

Noise detection subsystem 130 is configured to detect the presence of non-acoustic stimuli which, as discussed above, result in uncorrelated signals produced by the microphone array 110. In particular, the noise detection subsystem 130 may be configured to determine whether the signal from a particular microphone is sufficiently uncorrelated with the signal from another microphone in the microphone array 110. The noise detection subsystem 130 is further configured to control the output signal generator 120 such that the amount of noise in the output audio signal due to non-acoustic stimuli is reduced. For instance, the noise detection subsystem 130 may generate a control signal that causes the output signal generator 120 to perform the above mentioned switching between the output of the beamformer and the output of the noise reduction circuit.

The noise detection subsystem 130 may, in response to detecting wind or other non-acoustic stimuli, change the contributions of the one or more microphone signals to the output audio signal produced by the output signal generator 120. In some embodiments, the noise detection subsystem 130 switches the output signal generator 120 from a first operating mode to a second operating mode. For instance, the noise detection subsystem 130 may configure the output signal generator 120 to operate in a directional mode when a non-acoustic stimuli is not detected, and then switch the output signal generator to a second mode which is less directional but significantly less sensitive to non-acoustic stimuli when the noise detection subsystem positively detects such stimuli. The directional mode can be a mode in which microphone signals from multiple microphones in the microphone array 110 are used to form the output audio signal in accordance with a directional response. The second mode can be a mode in which the output audio signal corresponds to a response of at least a single omnidirectional microphone. The second mode can alternatively be a mode in which microphone signals from multiple microphones in the microphone array 110 are used to form an output signal which is significantly less sensitive to non-acoustic stimuli, but also suffers from being less directional than the directional mode, yet still has some directional characteristics.

Reconfiguration of the output signal generator 120 in response to detection of non-acoustic stimuli does not necessarily involve switching between discrete operating modes. For instance, as explained below in connection with the embodiment of FIG. 3, the output audio signal can be a result of blending intermediate signals (e.g., through a summing operation), where the contributions of individual microphone signals to at least some of the intermediate signals is varied depending on whether non-acoustic stimuli are detected. When a non-acoustic stimulus has been detected, each microphone signal from the microphone array 110 can be evaluated moment by moment (e.g., for digital implementations every one or more samples, for analog implementations, every instant) so as to repeatedly determine, at regular intervals, which microphone signal has the lowest instantaneous magnitude, wherein the moment-by-moment minimum magnitude signal is weighted higher than all other microphone signals by a gain factor. The gain factor can be applied using a crossfader. The crossfader can fade in the signal that has the latest minimum value while fading out the signal that had a previous minimum value. Fading in corresponds to, for example, linearly increasing the contribution of a first input signal in the output signal while linearly decreasing contribution of a second input signal in the output signal.

Mismatch detection subsystem 140 is configured to detect mismatches between the sensitivities of microphones in the microphone array 110 and to adjust the amount of gain applied to one or more microphones so that the sensitivities of all microphones in the microphone array 110 are approximately the same. As described below, in certain embodiments, mismatch detection is implemented by generating an RMS (root mean square) signal for one or more microphones and then comparing each RMS signal to a reference RMS signal from a reference microphone in order to adjust the gain of the one or more microphones based on a result of the comparison. Alternatively, in some embodiments, the reference RMS signal corresponds to the RMS of an average of the signals of all the microphones in the array. Using the average has certain benefits over using a single reference, including better matching performance if there is a problem with the reference microphone (e.g., the reference microphone is plugged, broken, or compromised due to aging). Additionally, since the sensitivity of all microphone capsules is usually specified with a tolerance (e.g., 300 mV/Pa+/−3 dB), and this tolerance follows a normal or Gaussian distribution, using the average of multiple capsules as the reference signal serves to decrease the overall sensitivity tolerance.

The mismatch detection subsystem 140 can perform a gain adjustment by, for example, varying an input to an amplifier (e.g., an operational amplifier (op-amp)) that amplifies a particular microphone signal. The amplified microphone signal can be used in place of the original microphone signal during mismatch detection. For instance, the amplified microphone signal can be used for generating one of the RMS signals described above and for input to the beamformer of the output signal generator 120. In some embodiments, the gain is adjusted in proportion to the difference between the inputs of a comparator that compares two RMS signals to each other, e.g., an RMS signal from the microphone to be adjusted and a reference RMS signal. In such embodiments, the output of the comparator may form a control signal for triggering the gain adjustment.

Figure 2:
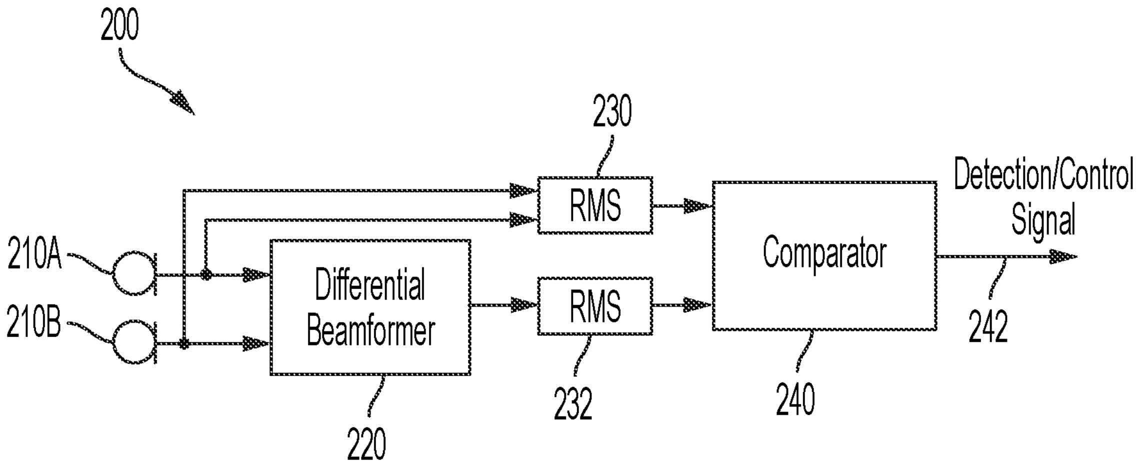
FIG. 2 is a simplified schematic of a system for detecting non-acoustic stimuli according to certain embodiments.

FIG. 2 is a simplified schematic of a system 200 for detecting non-acoustic stimuli according to certain embodiments. The block elements depicted in FIG. 2 can be implemented in hardware, software, or a combination of hardware and software. The system 200 can be used to implement the noise detection subsystem 130 in FIG. 1 and includes a microphone array comprising a plurality of microphones (e.g., microphones 210A and 210B). The system 200 further includes a differential beamformer 220, RMS units 230 and 232, and a comparator 240.

Microphones 210A, 210B can be, but are not necessarily, omnidirectional. Each of the microphones 210A, 210B comprises a capsule configured to produce a corresponding microphone signal in response to sound impinging on the capsule. The microphones 210A, 210B can be placed within a shared housing, e.g., inside the body of a smart speaker or other portable electronic device. Alternatively, each of the microphones 210A, 210B can be placed in a separate housing. In some embodiments, the microphones 210A, 210B are external microphones that can be repositioned to a desired location such as around a table in a conference room. The microphones 210A, 210B can also be permanently installed in an operating environment, e.g., mounted on a panel in a vehicle cabin. In another example, if external microphones are positioned in a conference room, adaptive signal processing may be used to estimate an arrival location for each talker and preserve signals from "directions of interest" corresponding to the estimated arrival locations.

Differential beamformer 220 is configured to output a beamformed signal to the RMS unit 232. The beamformed signal is generated based on a combination of the microphone signal produced by microphone 210A and the microphone signal produced by microphone 210B. The beamformer 220 is differential in that the output of the beamformer 220 is based on a difference between the signals of the microphones 210A and 210B. Although FIG. 2 depicts only two microphones, the microphone array can include any plurality of microphones. Further, the inputs to the beamformer 220 are not limited to two microphone signals. For instance, the beamformer 220 may generate the beamformed signal based on a combination of the difference between a first pair of microphones and the difference between a second pair of microphones.

As indicated above, a beamformer can combine microphone signals to produce an overall response for a microphone array according to a desired polar pattern. Thus, the beamformer 220 may perform null steering by, for example, delaying the microphone signal received from microphone 210A relative to the microphone signal received from microphone 210B, prior to the subtraction operation. For instance, beamformer 220 may include a delay stage that delays the signal from microphone 210A, followed by a summing stage that sums or subtracts the delayed signal with the signal from microphone 210B. The summing stage may also perform mathematical integration. For instance, the delayed signal from microphone 210A and the signal from microphone 210B can be provided as inputs to an op-amp configured as a summing integrator, thus also performing the function of a post-filter.

RMS unit 230 is configured to generate an RMS value based on the signals from the microphones 210A and 210B. In particular, the RMS unit 230 can calculate the RMS value for the average of signals of the microphones 210A and 210B (and any additional microphones in the microphone array) to generate an RMS of the average signal.

RMS unit 232 is, similar to the RMS unit 230, configured to generate an RMS signal. Unlike the RMS unit 230, the RMS unit 232 operates on a single input, which is the output of the beamformer 220. Therefore, the RMS signal generated by the RMS unit 232 represents the RMS of the beamformed signal (e.g., from a differential variety).

Comparator 240 is configured to compare the RMS signal generated by the RMS unit 230 to the RMS signal generated by the RMS unit 232 to generate, based on a result of the comparison, a detection signal 242. The detection signal 242 indicates whether wind or other non-acoustic stimulus is present. If the magnitude of the detection signal 242 exceeds a certain threshold, then this would indicate that there is a significant difference between the RMS value for the average of each microphone in the entire microphone array and the RMS value of the beamformed signal. In particular, in the presence of non-acoustic stimuli, it can be expected that the output of the beamformer 220 will be significantly greater than the average microphone signal or, alternatively, significantly greater than the output of an individual omnidirectional microphone. This principle remains true for all frequencies whose gain value is higher than 1 in the post filter, below the aliasing region.

In an alternative embodiment, one of the microphones 210A and 210B may be designated as a reference microphone and the RMS unit 230 generates its RMS signal using only the signal from the reference microphone instead of the average of all the microphones in the array. Which of the microphones in the array is used as the reference microphone can be fixed.

The use of the RMS units 230 and 232 to generate the inputs of the comparator 240 is advantageous if the RMS is insensitive to phase mismatch between microphones (e.g., due to differences in time of arrival). This can be ensured by designing RMS units 230 and 232 as magnitude detectors with appropriate time constants governing the rise and fall time limits respectively of their output signals. Therefore, the RMS units 230 and 232 operate to smooth the average level of their respective inputs. Computing RMS produces a non-zero time-weighted average. In contrast, the time-weighted average of a low-pass filter is zero (since the expectation of the waveform to be positive and negative is randomly distributed). Therefore, using RMS units 230 and 232 improves detection accuracy relative to an alternative detection method in which a low-pass filter is applied to the beamformed signal and the output of the low-pass filter is compared to a threshold.

Figure 3:
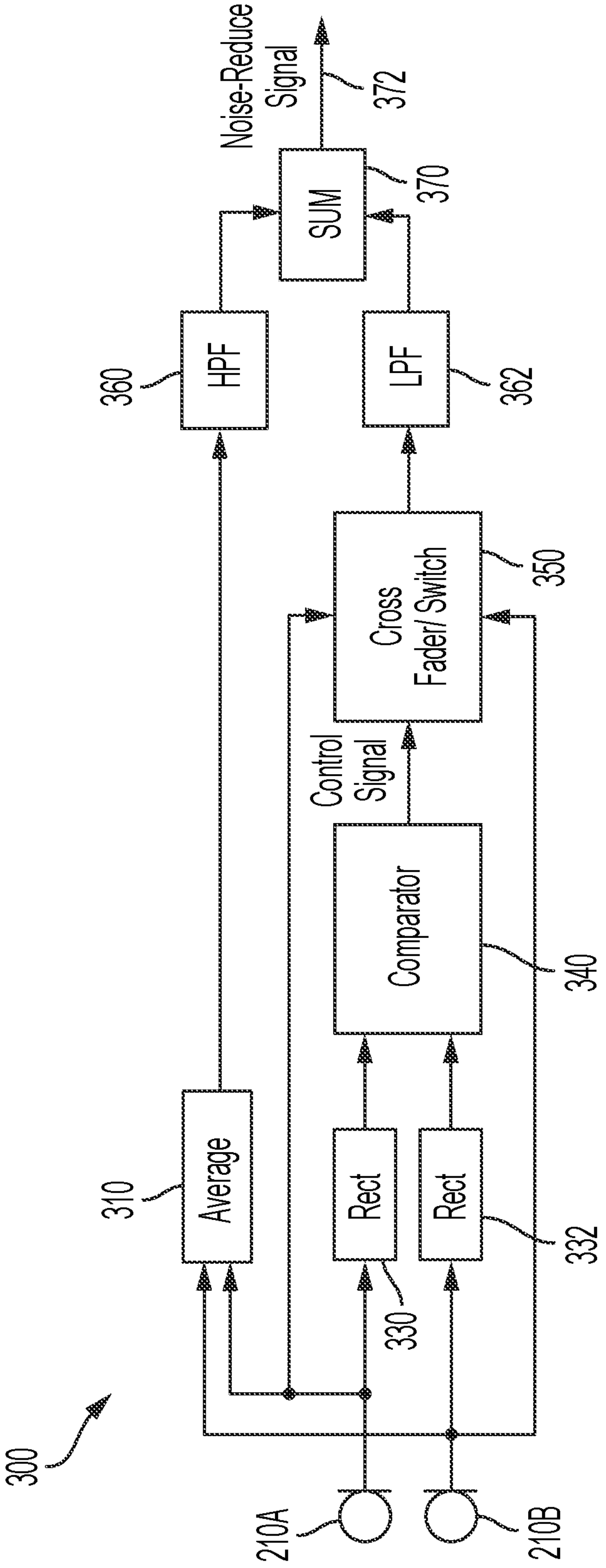
FIG. 3 is a simplified schematic of a system for reducing the magnitude response to non-acoustic stimuli according to certain embodiments.

FIG. 3 is a simplified schematic of a system 300 for reducing the magnitude response to non-acoustic stimuli according to certain embodiments. The block elements depicted in FIG. 3 can be implemented in hardware, software, or a combination of hardware and software. The system 300 operates in the time domain and can be used to implement the noise detection subsystem 130 and the output signal generator 120. The system 300 includes an averaging unit 310, rectifiers 330 and 332, a comparator 340, a cross fader or switch 350, a high-pass filter (HPF) 360, a low-pass filter (LPF) 362, and a summation unit 370.

Averaging unit 310 is configured to generate an average signal corresponding to the average of the microphone signals from all the microphones in the microphone array. FIG. 3 depicts two microphones (210A, 210B). However, as described, the microphone array can include any plurality of microphones. The average signal is input to the HPF 360. In some embodiments, the averaging unit 310 implements a time-of-arrival alignment function to make sure that the responses to an acoustic stimulus from a direction of interest, from all microphones in the array 110, are time aligned and in phase with each other. The averaging unit 310 may perform the alignment by introducing a delay to one or more microphone signals so that resulting compensated signals are in phase with respect to the acoustic stimulus from the direction of interest. For example, the averaging unit may generate a first compensated signal based on a first microphone signal and a second compensated signal based on a second microphone signal, where the first microphone signal and the second microphone signal have equal magnitude and phase relationship to the acoustic stimulus.

Rectifier 330 operates on the microphone signal from the microphone 210A. Rectifier 332 operates on the microphone signal from the microphone 210B. A separate rectifier can be provided for each microphone in the microphone array. The rectifiers 330, 332 are configured to convert their respective microphone signals into signals having a single polarity (e.g., by inverting negative signal values), representing the instantaneous magnitude of their respective microphone signals. The rectified microphone signals are input to the comparator 340.

Comparator 340 is configured to compare the rectified microphone signals to generate a control signal, as an input to the cross fader/switch 250, indicating which of the rectified microphone signals has lower instantaneous magnitude. In implementations featuring three or more microphones, the comparator 340 can provide for comparison of rectified signals from such additional microphones, so that the output of the comparator 340 indicates which microphone among the three or more microphones has the lowest instantaneous magnitude. Comparator 340 can therefore include multiple comparison stages, e.g., a first stage comparing signals from a first pair of microphones, a second stage comparing signals from a second pair of microphones, and a third stage comparing the result of the first stage to the result of the second stage. Alternatively, other embodiments can utilize a sorting algorithm inside the comparator, to identify the minimum instantaneous magnitude and provide an index to associate the correct microphone signal to which the minimum belongs.

Cross fader/switch 350 is configured to generate, using the microphones signals produced by the microphones 210A and 210B (and any additional microphones in the microphone array), a signal for input to the LPF 362. The output of the cross fader/switch 350 can be a signal corresponding to one of the microphone signals, e.g., switching entirely to the signal from microphone 210B when the output of the comparator 340 indicates that the signal from microphone 210B has the lowest instantaneous magnitude.

If implemented as a cross fader, the output of the cross fader/switch 350 corresponds to a blend of signals from different microphones. The degree to which an individual microphone signal contributes to the output of the cross fader can be controlled based on the output of the comparator 340. For instance, when the output of the comparator 340 indicates that the signal from microphone 210B has the lowest instantaneous magnitude, the signal from 210B can be faded-in to its maximum allowable level (e.g., gain of one), while simultaneously the signal from microphone 210A can be faded out to its minimum allowable level (e.g., gain of zero). The fade-in and fade-out apply gain with the same rate of change. If the rate of change of gain is too slow, the response to the non-acoustic stimuli will not be effectively reduced. However, the time rate of change of the gain should not be too fast to avoid distorting the response to the acoustic stimuli of interest.

LPF 362 is configured to filter out high frequency components of the signal generated by the cross fader/switch 250. The output of the LPF 362 therefore corresponds to the low frequency components of a signal that has now been desensitized to non-acoustic stimuli. As discussed above, highly directional beamformers may consequently increase the sensitivity to non-acoustic stimuli, especially at low frequencies. It is therefore desirable for the low frequency portion of an audio output signal to be generated from microphone signals which are processed to be less sensitive to non-acoustic stimuli, but equally sensitive to acoustic stimuli from a direction of interest. The combination of cross fader/switch 350 and LPF 362 enables such a low frequency portion to be generated.

HPF 360 is configured to filter out low frequency components of the average signal generated by the averaging unit 310. The output of the HPF 360 is provided, together with the output of the LPF 362, to the summation unit 370. Since it is so unlikely that wind, or other non-acoustic stimuli, will create equal disturbances on all microphones in the array 110 at the same time, the averaging performed by the averaging unit 310 will generate an output signal which is lower in sensitivity to non-acoustic stimuli compared to any of the microphone signals on their own. Averaging is not as efficient at lowering this sensitivity when compared to the crossfader operation, however, the crossfader operation adds noise and distortion in the higher frequencies as a result. Therefore, in some embodiments, the lower frequencies are kept, from the cross fader/switch 350, by using LPF 362, and the higher frequencies of the averaging unit 310 output are kept, by using HPF 360. Furthermore, a non-acoustic stimuli such as wind does not generate significant signal levels at higher frequencies, say, above 2 or 3 kHz.

Summation unit 370 is configured to generate a noise-reduced signal 372 by adding together the outputs of the HPF 360 and the LPF 362. The noise-reduced signal 372 therefore corresponds to a signal whose low frequency components are derived from one or more microphone signals that are maximally less sensitive to non-acoustic stimuli while remaining undistorted for acoustic stimuli. In addition, high frequency components of the signals are reduced in sensitivity to non-acoustic stimuli, remain undistorted for acoustic stimuli from a direction of interest, and generate no additional noise and distortion in order to achieve the lower sensitivity to non-acoustic stimuli, which are derived from the average of all the time-aligned microphone signals. Averaging N microphones results in sensitivity reduction to non-acoustic stimuli by a factor of 10*log (N). The output from averaging two microphones during a wind buffeting event will typically be 3 dB lower than either single microphone's output (for a long term exposure).

Figure 5:
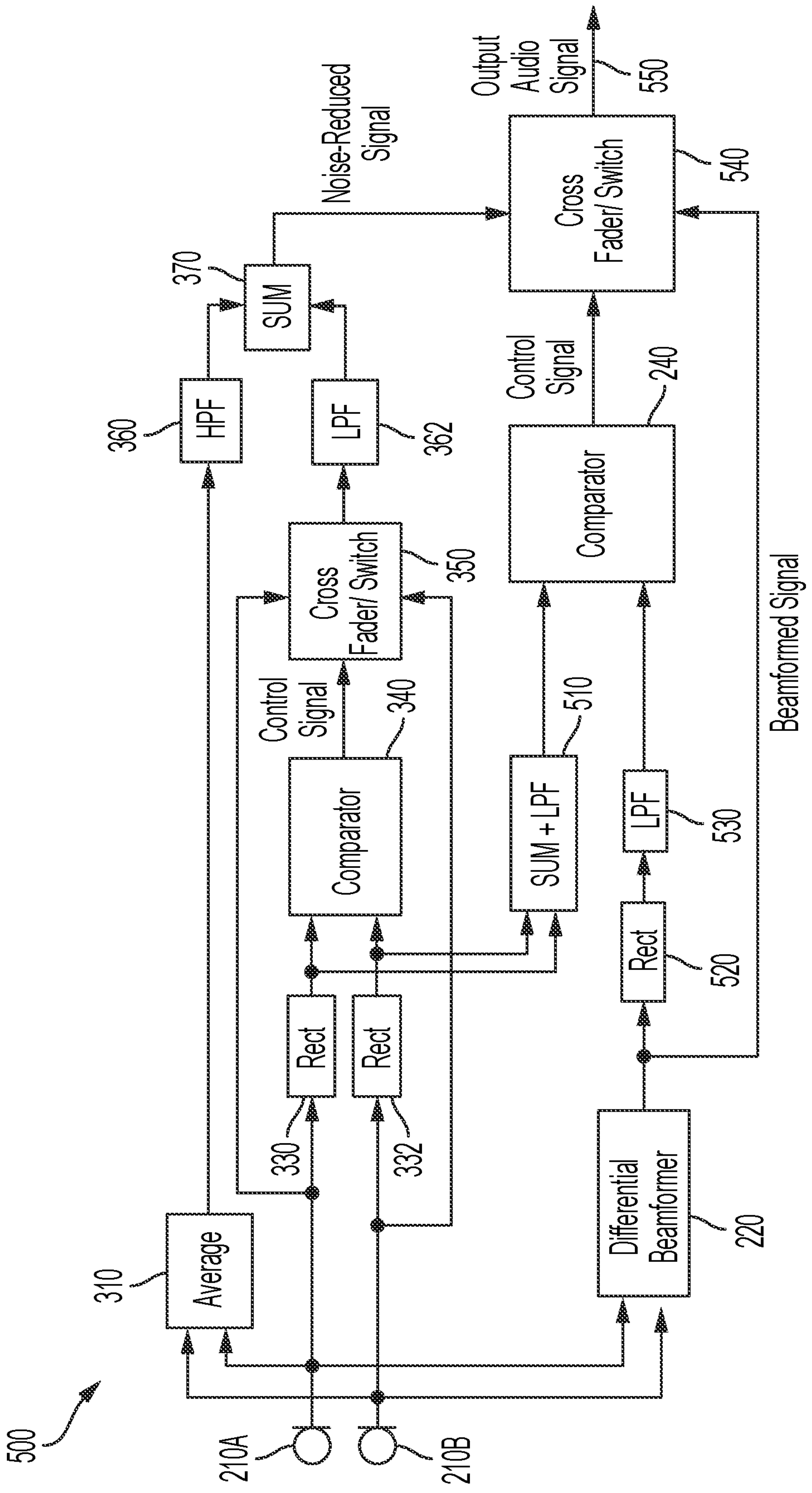
FIG. 5 is a simplified schematic of a system that combines the noise detection technique illustrated in FIG. 2 with the noise reduction technique illustrated in FIG. 3.

The noise-reduced signal 372 can be used as an output audio signal in place of the output of a beamformer (e.g., instead of the output of the beamformer 220 in FIG. 2). When the microphone array 110 includes multiple omnidirectional capsules, the noise reduced signal will offer directional behavior for high frequencies and not for low frequencies, in response to acoustic stimuli. Alternatively, as shown in the embodiment of FIG. 5, an output audio signal can be generated by using a cross fader unit 540 to blend a noise-reduced signal with a beamformed signal, in like manner to the blending of microphone signals performed by the cross fader/switch 350. This can potentially be useful to create a moment by moment tradeoff between reducing sensitivity to non-acoustic sources, and having a high directivity response characteristic for low frequency sources. However, this approach has limitations since the high directivity response will contain less acoustic noise in its output compared to the non-acoustic stimuli processed output, resulting in "pumping" of the acoustic noise level, modulated by non-acoustic stimuli. In some embodiments this is limited somewhat by using a fast fade-in of non-acoustic processed output and a corresponding long fade out time. This is sometimes referred to as a fast attack, slow release characteristic.

The system 300 operates to generate the noise-reduced signal with the lowest sensitivity to non-acoustic stimuli while preserving the sensitivity to acoustic stimuli from a direction of interest, when there is a wind buffeting or other non-acoustic stimuli present on one or more microphones. Since the microphones are spatially diverse and are nearly guaranteed to respond dissimilarly to a non-acoustic stimuli at any particular moment in time, one of the microphone signals, in the presence of wind, will nearly always have a lower instantaneous magnitude than the other microphone signal(s). In contrast, all the microphones are expected to respond quite similarly to acoustic stimuli. By comparing rectified microphone signals, the system 300 can identify which has the lower instantaneous magnitude. The system 300 switches or cross-fades between each microphone signal to favor the microphone signal with lowest instantaneous magnitude (e.g., at any particular time interval). The microphone signals corresponding to the response to acoustic stimuli such as voice are retained in the output of the HPF 360, without processing artifacts such as noise and distortion, and will therefore pass through unaffected by the switching or cross fading. The microphone signals corresponding to the response to acoustic stimuli are also retained in the output of the LPF 362, however, there may be noise artifacts generated from the crossfading/switching operation which, to some degree, pass through the LPF 362. Thus, a tradeoff for maximally reducing sensitivity to non-acoustic stimuli is a noise artifact generated in the crossfader/switch operation. In some embodiments, the corner frequency of the LPF 362 and HPF 360 are chosen to balance this tradeoff.

Figure 4:
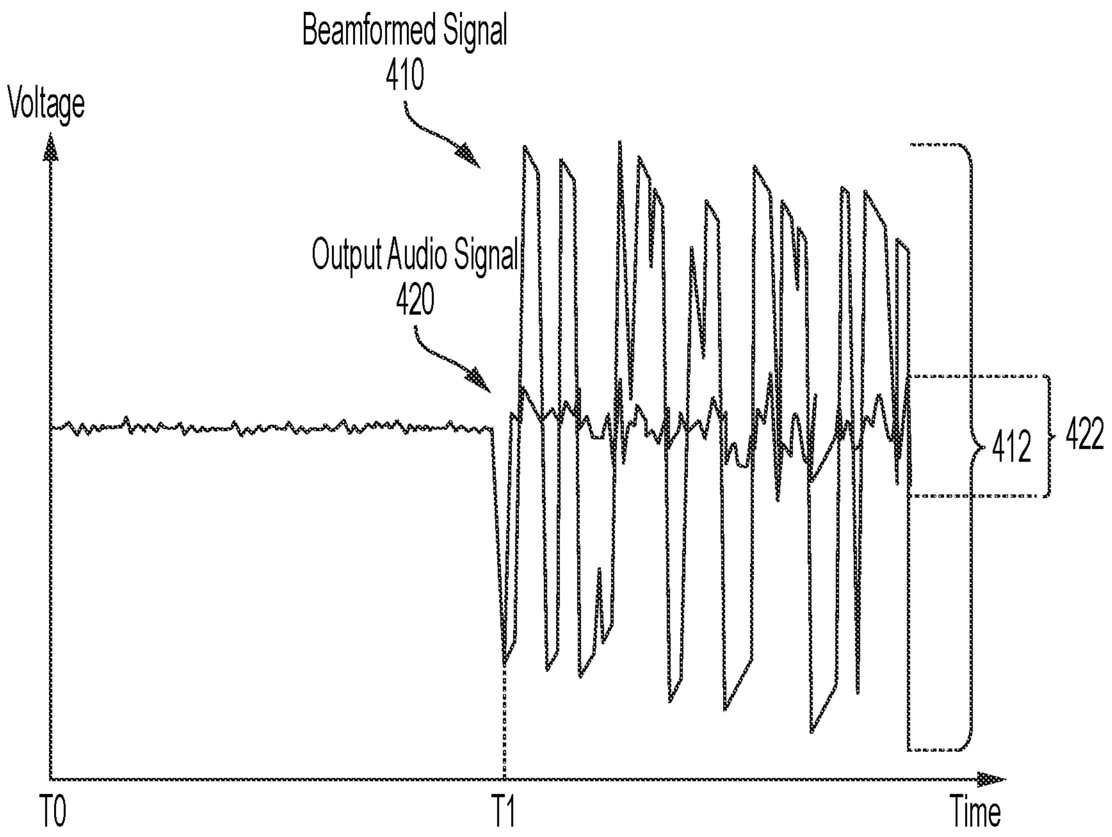
FIG. 4 is a graph illustrating an example of a beamformed signal and an output audio signal generated by switching to a noise-reduced signal in response to detection of non-acoustic stimuli.

FIG. 4 is a graph illustrating an example of a beamformed signal 410 (e.g., the output of beamformer 220) and an output audio signal 420 generated by switching to a noise-reduced signal in response to detection of non-acoustic stimuli. The beamformed signal 410 and the output audio signal 420 are identical between times $T_0$ and T1. At T1, a switch is made from the beamformed signal 410 to a noise-reduced signal (e.g., the output of the summation unit 370) in response to detection of non-acoustic stimuli. As shown in FIG. 4, after T1, an amplitude swing 412 of the beamformed signal 410 is significantly larger than an amplitude swing 422 of the output audio signal 420. Thus, the response to non-acoustic stimuli is much more noticeable in the beamformed signal 410, whereas the response to non-acoustic stimuli is suppressed in the output audio signal 420.

FIG. 5 is a simplified schematic of a system 500 that combines the noise detection technique illustrated in FIG. 2 with the noise reduction technique illustrated in FIG. 3. The block elements depicted in FIG. 5 can be implemented in hardware, software, or a combination of hardware and software. Components corresponding to those described earlier in connection with FIGS. 2 and 3 are depicted with the same reference numerals. The system 500 can be used to implement the noise detection subsystem 130 and the output signal generator 120.

In the embodiment of FIG. 5, functionality equivalent to that of the RMS unit 230 is provided by the combination of the rectifiers 330, 332 and a summation-plus-LPF unit 510 since the RMS of a signal is effectively the same as rectifying and then low-pass filtering the signal. Similarly, functionality equivalent to that of the RMS unit 232 is provided by the combination of a rectifier 520 and an LPF 530. As shown in FIG. 5, the system 500 includes a cross fader/switch 540 that forms an output audio signal 550 according to a control signal from the comparator 240, by blending or switching between the output of the summation unit 370 (the noise-reduced signal 372 in FIG. 3) and the output of the beamformer 220.

Switching or cross fading quickly between two signals (e.g., average or single microphone) that contribute to an output audio signal will generate two forms of higher frequency information (new noise). First, the switching or cross fading may sometimes result in a steep change in voltage over a small change in time (large dV/dt), generating noise with a wide bandwidth. Second, the switching mechanism itself (if implemented in analog circuitry) can potentially generate sharp transients from the transfer of stored energy on either side of the switch mechanism. These transients can be filtered out in a number of different ways. For instance, in some embodiments, switching noise introduced into the output audio signal 550 as a result of switching performed by the cross fader/switch 540 is reduced by low-pass filtering the output audio signal 550 through one or more low-pass filter stages (not depicted). Alternatively, switching noise can be reduced by configuring the cross fader/switch 540 with a limit on its maximum slew rate, and/or a time constant for the crossfade function governing the fade-in and simultaneous fade-out times.

Figure 6:
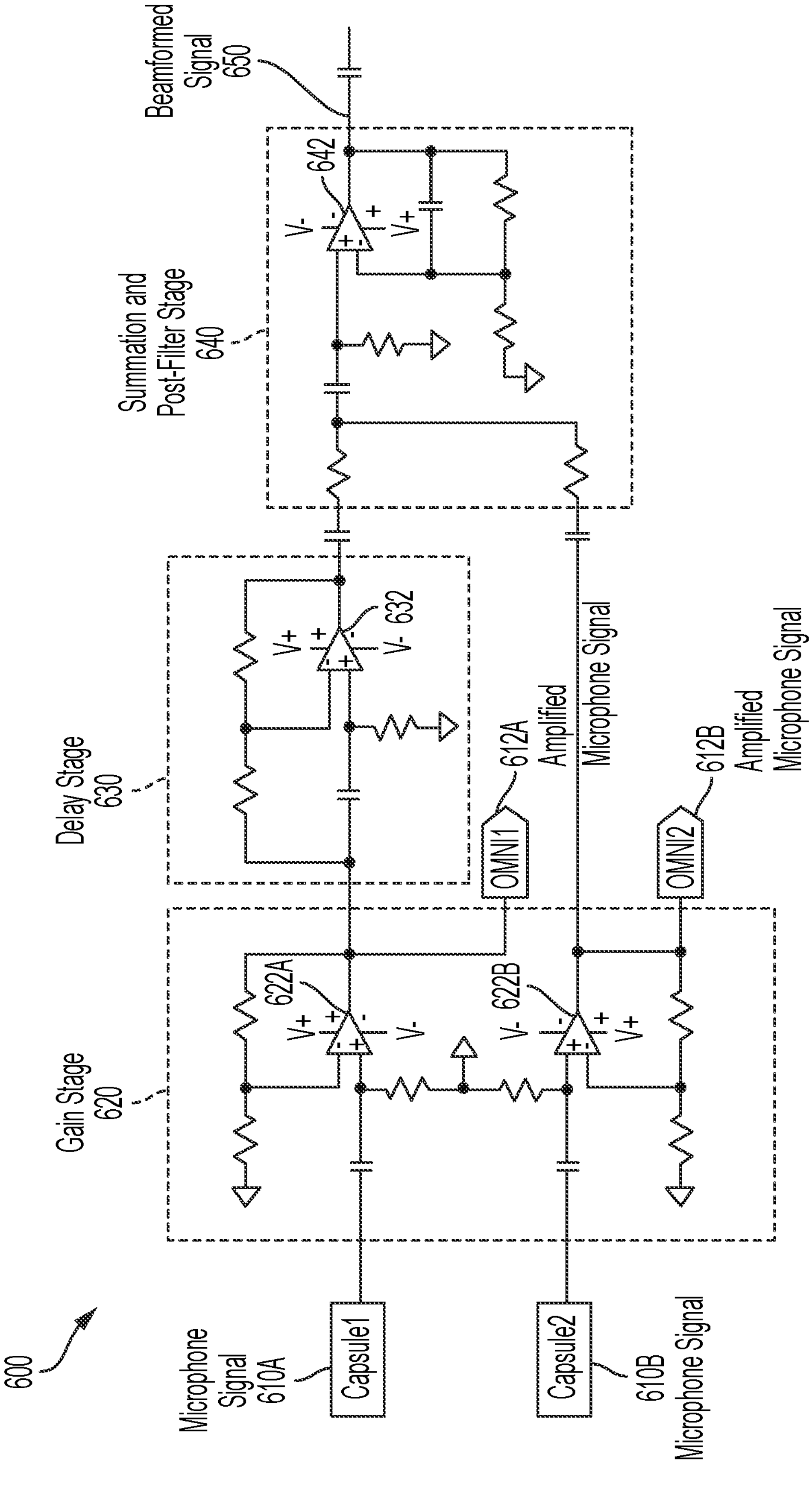
FIGS. 6-10 illustrate different portions of a circuit for detecting and reducing sensitivity to non-acoustic stimuli according to certain embodiments.

FIG. 6 illustrates a partial circuit 600 for detecting and reducing sensitivity to non-acoustic stimuli according to certain embodiments. The circuit 600 operates in conjunction with the circuits depicted in FIGS. 7-10 and includes a gain stage 620, a delay stage 630, and a summation and post-filter stage 640. The gain stage 620 is a low noise gain stage that operates to amplify microphone signals from a microphone array, for further processing. The gain stage 620 includes op-amps 622A and 622B that amplify respective microphone signals 610A (Capsule1) and 610B (Capsule2) to generate amplified microphone signals 612A (OMNI1) and 612B (OMNI2). Gain stage 620 therefore helps reduce the impact of the electrical noise floor of subsequent circuits from degrading the low magnitude signals produced by the microphone signals 610A, and 610B.

Delay stage 630 includes an op-amp 632 configured to apply a time delay and phase inversion to the amplified microphone signal 612A. Summation and post-filter stage 640 is configured to sum the output of the delay stage 630 with the amplified microphone signal 612B via a common node. The summed result is then filtered and amplified by an op-amp 642 to produce a differential beamformer output signal 650. Signal 650 is now at the proper magnitude level to drive downstream connected equipment, such as telecommunication terminals, and/or voice recognition systems.

Figure 7:
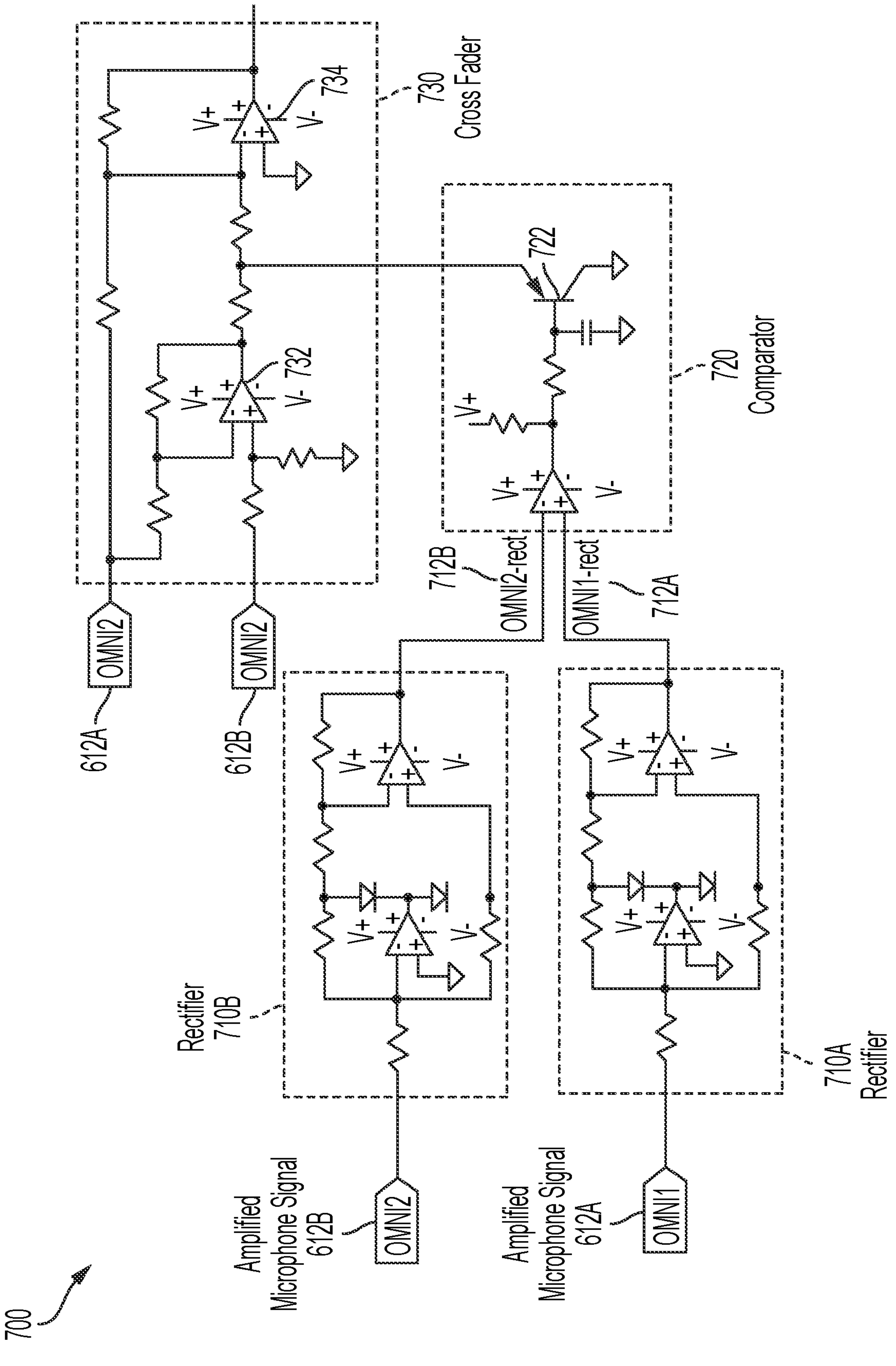

FIG. 7 illustrates a partial circuit 700 that operates on the amplified microphone signals 612A, 612B generated by the circuit 600 in FIG. 6. The circuit 700 includes rectifiers 710A and 710B. The rectifier 710A is analogous to the rectifier 330 in FIG. 3 and rectifies the amplified microphone signal 612A to generate a rectified signal 712A (OMNI1-rect). The rectifier 710B is analogous to the rectifier 332 and rectifies the amplified microphone signal 612B to generate a rectified signal 712B (OMNI2-rect). The rectifiers 710A, 710B are op-amp based circuits that perform voltage rectification using diodes.

Comparator 720 is an op-amp based circuit analogous to the comparator 340. The comparator 720 compares the rectified signal 712A to the rectified signal 712B to control a bipolar junction transistor 722 based on the voltage difference between the rectified signals 712A, 712B. The emitter of the bipolar junction transistor 722 forms a control signal for controlling the operation of a cross fader 730.

Cross fader 730 is an op-amp based circuit analogous to the cross fader/switch 350. The cross fader 730 adjusts the contributions of the amplified microphone signals 612A and 612B based on the control signal produced at the bipolar junction transistor 722. The control signal influences the composition of the mixture of 612A and 612B which is mixed by op-amp 734. The op-amp 734 generates the output of the cross fader 730. The output of op-amp 734 is equal to the inverse polarity of signal 612A plus the inverse of the output of op-amp 732, which is signal 612B minus 612A. When the control signal from the transistor 722 is fully on, the output of op-amp 732 is pulled to ground. Therefore, when 712B is greater than 712A, the output of op-amp 734 is equal to the inverse polarity (negative) 612A. When 712B is less than 712A, the output of op-amp 734 is equal to the sum of negative 612A plus positive 612A plus negative 612B, which is equal to negative 612B.

Figure 8:
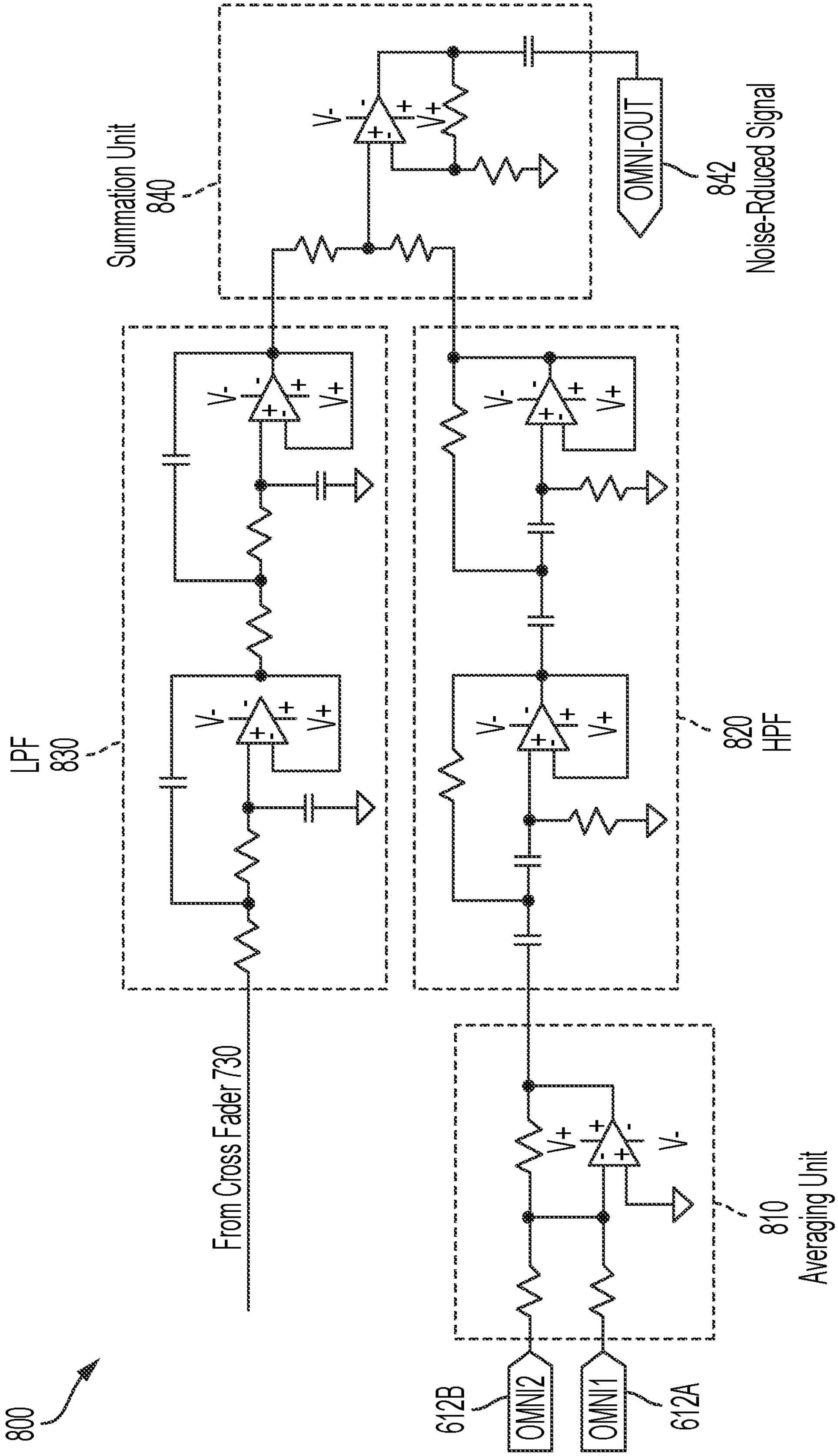

FIG. 8 illustrates a partial circuit 800 that operates on the output of the cross fader 730 in FIG. 7. The circuit 800 includes an inverting averaging unit 810, an HPF 820, an LPF 830, and a summation unit 840. Averaging unit 810 is an op-amp based circuit that is analogous to the averaging unit 310. The averaging unit 810 generates a signal corresponding to the average of the amplified microphone signals 612A and 612B, but with inverted phase so that when combined with the output from crossfader 730 through the HPF 820 and LPF 830, the resultant is phase aligned.

HPF 820 is analogous to the HPF 360 and includes one or more high-pass filtering stages. In the embodiment depicted in FIG. 8, the HPF 820 has two op-amp based filters configured to filter out the low frequency components of the signal generated by the averaging unit 810. Specifically, the HPF 820 is a second order high-pass filter configured according to a Sallen-Key topology.

LPF 830 is analogous to the LPF 362 and includes one or more low-pass filtering stages configured according to a topology this is counterpart to the topology of the HPF 820. In the embodiment depicted in FIG. 8, the LPF 830 has two op-amp based filters configured to filter out the high frequency components of the signal generated by the cross fader 730.

Summation unit 840 is an op-amp based circuit analogous to the summation unit 370. The summation unit 840 is configured to sum the outputs of the HPF 820 and the LPF 830 to generate a noise-reduced signal 842 (OMNI-OUT) that corresponds to the noise-reduced signal 372.

Figure 9:
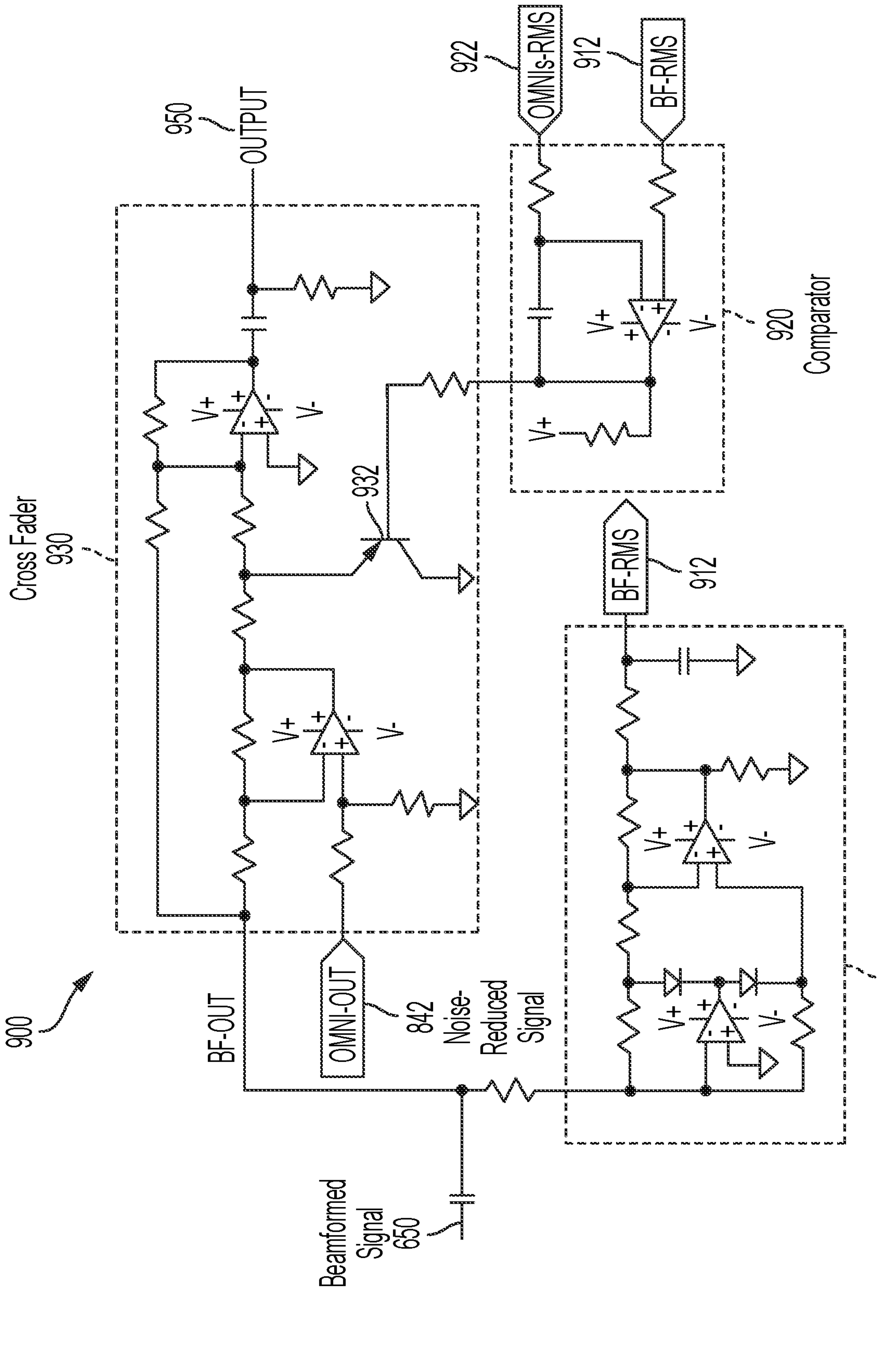

FIG. 9 illustrates a partial circuit 900 that operates on the beamformed signal 650 (generated by the summation and post-filter stage 640 in FIG. 6) and the noise-reduced signal 842 (generated by the summation unit 840 in FIG. 8). The circuit 900 includes an RMS unit 910, a comparator 920, and a cross fader 930.

RMS unit 910 is an op-amp based circuit analogous to the RMS unit 232 in FIG. 2. The RMS unit 910 is configured to generate, using rectification and low-pass filtering, an RMS signal 912 (BF-RMS) corresponding to the RMS magnitude of the beamformed signal 650.

Comparator 920 is an op-amp based circuit analogous to the comparator 240. The comparator 920 is configured to compare the RMS signal 912 to an RMS signal 922 to generate a control signal for the cross fader 930. The RMS signal 922 is an average RMS of all microphone signals and can be generated using the circuit depicted in FIG. 10. The comparator 920 operates in a manner similar to that of the comparator 720 in FIG. 7 and controls the emitter of a bipolar junction transistor 932 based on the voltage difference between the RMS signals 912, 922. For ease of illustration, the bipolar junction transistor 932 is depicted in FIG. 9 as being part of the cross fader 930 instead of the comparator 920.

Cross fader 930 is an op-amp based circuit analogous to the cross fader/switch 540 in FIG. 5. The cross fader 930 operates in a manner similar to that of the cross fader 730 in FIG. 7 and adjusts the contributions of the beamformed signal 650 and the noise-reduced signal 842 based on the control signal produced by the bipolar junction transistor 932. The cross fader 930 generates an output audio signal 950 corresponding to the output audio signal 550 in FIG. 5.

Figure 10:
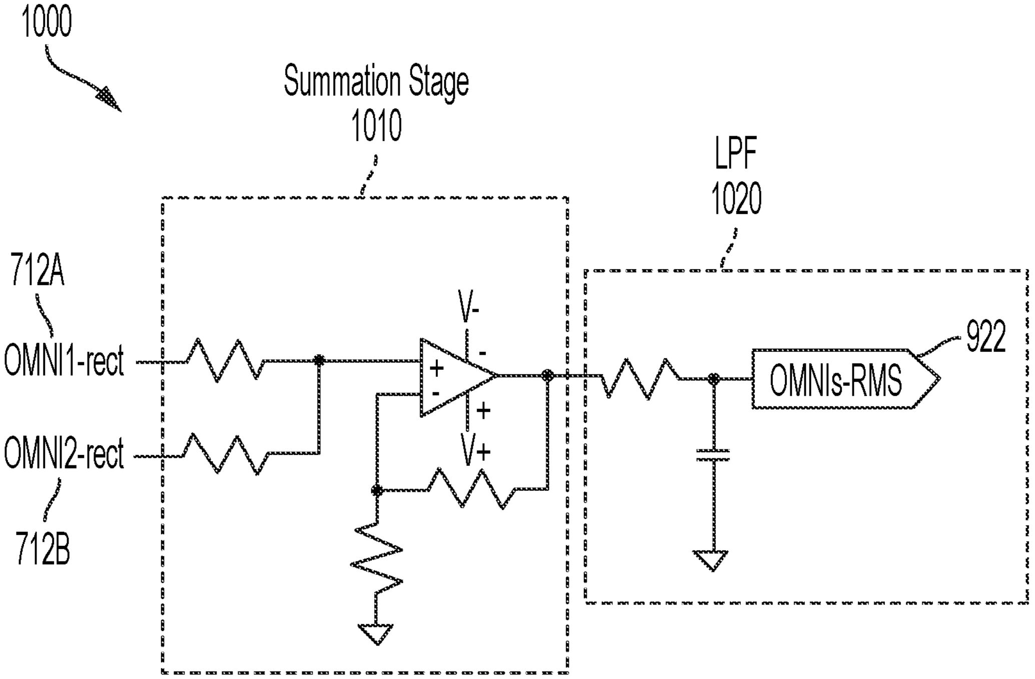

FIG. 10 illustrates a partial circuit 1000 that generates the RMS signal 922 for input to the comparator 920 in FIG. 9.

Circuit 1000 is analogous to the RMS unit 230 in FIG. 2 and includes an op-amp based summation stage 1010 that sums the rectified signals 712A and 712B generated by the rectifiers 710A and 710B in FIG. 7. The summation stage 1010 is followed by a low-pass filter 1020 implemented using a resistor and a capacitor.

Figure 11A:
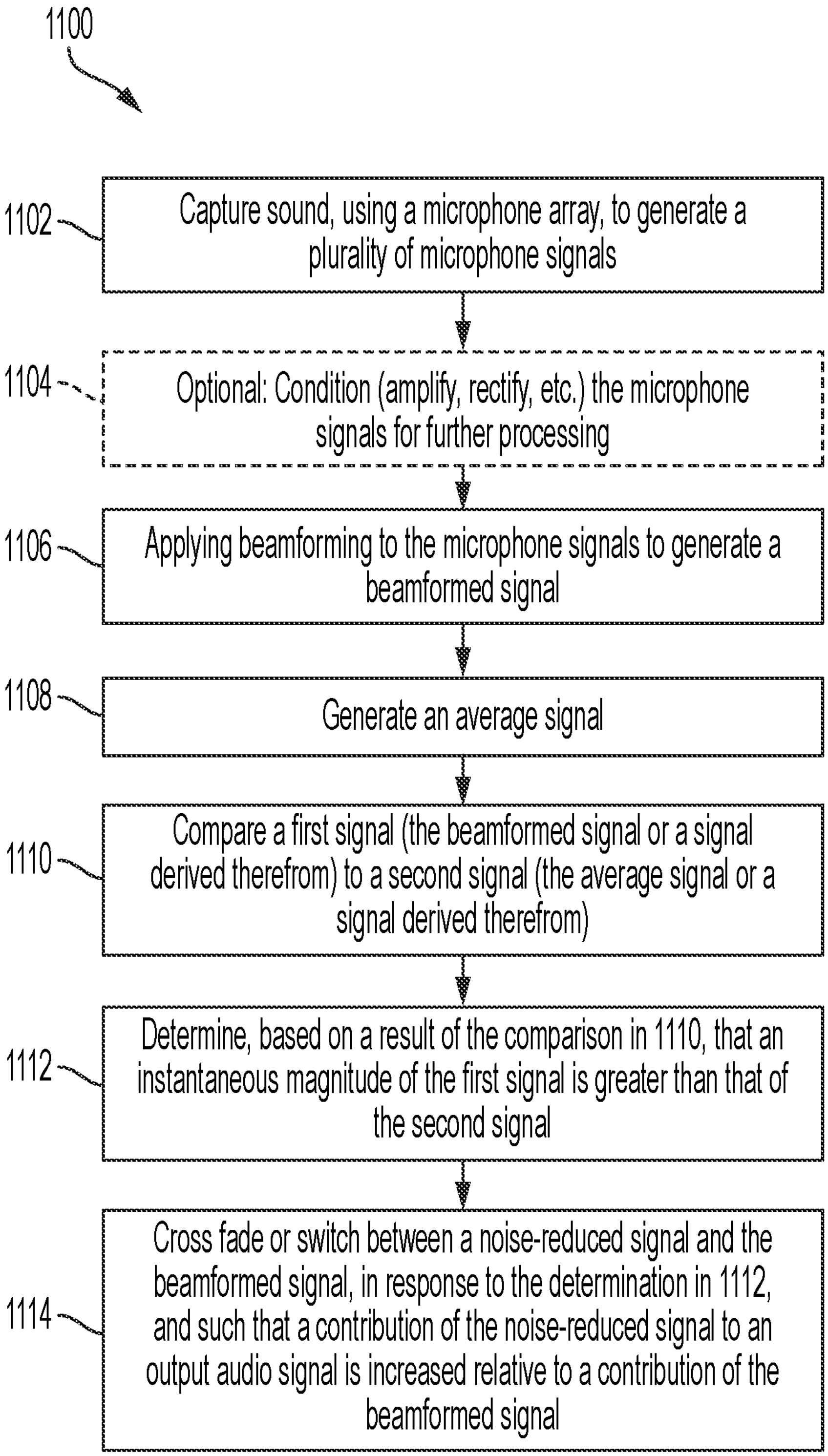
FIGS. 11A and 11B are flowcharts illustrating a process for detecting and reducing sensitivity to non-acoustic stimuli according to certain embodiments.
Figure 11B:
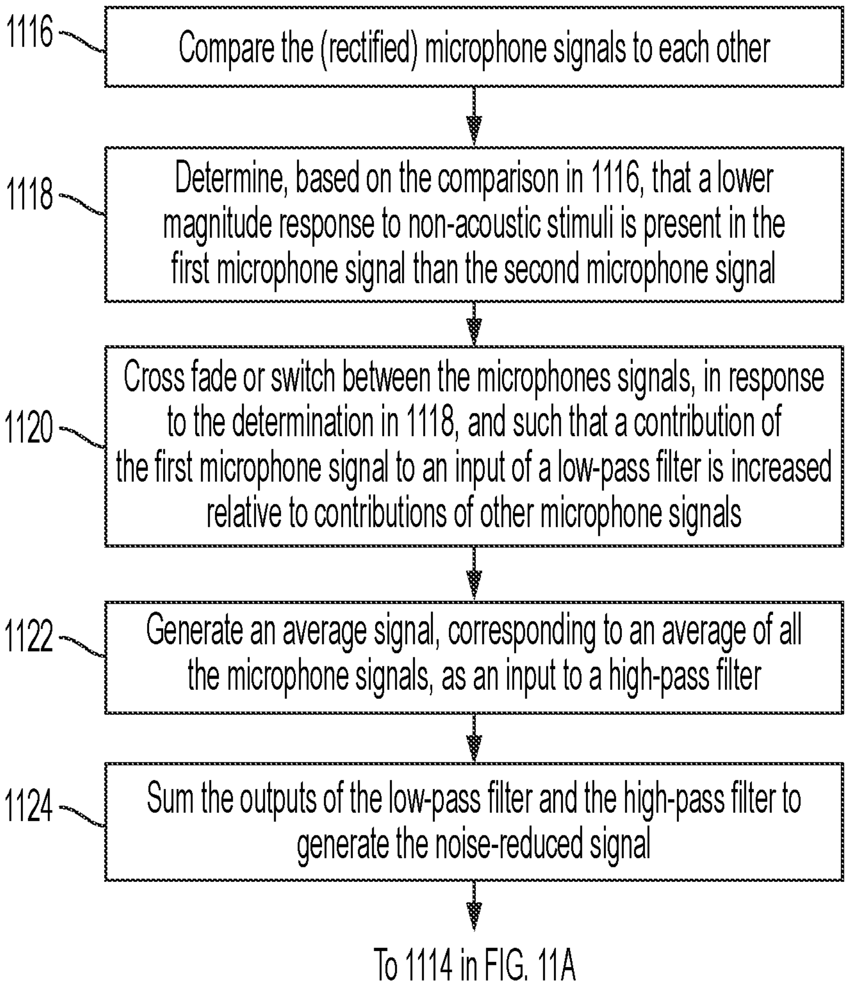

FIGS. 11A and 11B are flowcharts illustrating a process 1100 for detecting and reducing sensitivity to non-acoustic stimuli according to certain embodiments. The process 1100 can be performed using an output signal generator in conjunction with a noise detection system (e.g., implemented according to the embodiment in FIG. 2 or the embodiment in FIG. 5). In some embodiments, the process 1100 is performed, at least in part, through instructions executed by one or more processors (e.g., a digital signal processor) of a computer system.

At 1102, sound is captured using a microphone array. The microphone array includes at least a first microphone and a second microphone, and each of the microphones in the array produces a respective microphone signal in response to acoustic and non-acoustic stimuli in a physical environment. As explained earlier, sound from a particular acoustic stimuli in an environment may arrive at different times at different microphones depending on how the microphones are positioned relative to the stimuli. Therefore, a plurality of microphone signals may be generated by the microphone array over a period of time. The microphone signals may be received by a noise detection subsystem and include a first microphone signal generated based on a response of the first microphone and a second microphone signal generated based on a response of a second microphone to the same acoustic stimuli.

At 1104, the microphone signals are optionally conditioned for further processing. Such conditioning can include amplification, rectification, time of arrival synchronization, delay, filtering and/or other types of signal processing.

At 1106, a beamformed signal is generated by combining the first microphone signal and the second microphone signal using differential beamforming. The beamformed signal may be generated, for example, by a differential beamformer.

At 1108, an average signal is generated. The average signal corresponds to an average of the first microphone signal and the second microphone signal and can be generated by an averaging unit (e.g., averaging unit 310). Alternatively, as discussed above, microphone signals can be time-aligned so as to be in phase with respect to an acoustic stimulus. Thus, in some embodiments, the average signal in 1108 is generated as an average of two or more compensated signals, (e.g., the signals 1712A and 1712B shown in FIG. 17), with each compensated signal being generated based on a respective microphone signal, and with the compensated signals all being in phase with respect to one or more acoustic stimuli.

At 1110, as part of detecting non-acoustic stimuli, a first signal is compared to a second signal. The first signal can be the beamformed signal or a signal derived from the beamformed signal (e.g., the RMS of the beamformed signal). The second signal can be the average signal or a signal derived from the average signal (e.g., the RMS of the average signal). The comparison in 1110 can be performed using a comparator such as the comparator 240.

At 1112, a determination is made, based on a result of the comparison in 1110, that an instantaneous magnitude of the first signal is greater than that of the second signal. If the comparison in 1110 is made using a comparator, the determination in 1112 can be made implicitly, as part of performing the comparison, and will be reflected in the output of the comparator. The determination in 1112 confirms the presence of non-acoustic stimuli (i.e., that there is at least one non-acoustic source present). In some embodiments, the determination in 1112 may include determining that the magnitude of the response to non-acoustic stimuli exceeds a threshold, for example, when the magnitude of the first signal exceeds the magnitude of the second signal by a certain amount.

At 1114, an output audio signal is generated by, in response to the determination in 1112, switching or cross fading (e.g., using the cross fader/switch 540) between the beamformed signal and a noise-reduced signal such that a contribution of the noise-reduced signal to the output audio signal is increased (to a maximum gain value of one) and a contribution of the beamformed signal to the output audio signal is decreased (to a minimum gain value of zero). The time rate of change of gain for all signals in the crossfader operation can be controlled so that the resultant output signal is free from volume fluctuations. In certain embodiments, the generating of the noise reduced signal can be performed according to the processing depicted in FIG. 11B.

The switching or cross fading in block 1114 may involve switching from an overall response (e.g., an output signal generated based on a beamformer output) that is substantially directional to an overall response that is substantially omnidirectional, at least for certain frequencies. For example, the switch can be from a first overall response that is more directional (e.g., highly directional) at lower frequencies and less directional at higher frequencies, to a second overall response that is omnidirectional at the same lower frequencies and less directional (e.g., moderately directional) at the same higher frequencies.

FIG. 11B continues the flowchart of FIG. 11A and begins at 1116. Certain steps in FIG. 11B can be performed in parallel with the processing depicted in FIG. 11A. At 1116, the microphone signals received based on the capturing in 1102 of FIG. 11A (e.g., the first microphone signal and the second microphone signal) are compared to each other. In certain embodiments, the signals compared in 1116 are conditioned microphone signals generated based on the processing in 1104. For example, the comparison in 1116 may correspond to an operation performed on a first rectified signal and a second rectified signal generated by rectifying the first microphone signal and the second microphone signal, respectively.

At 1118, a determination is made, based on the comparison in 1116, that a lower magnitude response to non-acoustic stimuli is present in the first microphone signal than the second microphone signal. If more than two microphone signals were generated in 1102, the determination in 1118 may involve determining moment by moment that the first microphone signal has the lowest magnitude response to non-acoustic stimuli among all the microphone signals, e.g., because the first microphone signal or the rectified version of the first microphone signal has the lowest instantaneous magnitude, and the determination in 1112 has determined the presence of a non-acoustic stimulus.

At 1120, as part of generating a noise-reduced signal and in response to the moment by moment determination in 1118, a contribution of the first microphone signal (or whichever microphone signal was determined in 1118 to have the lowest magnitude response) to the input of a low-pass filter (e.g., the LPF 362) is increased by cross fading or switching between the microphone signals moment by moment. In some embodiments, the contribution of the first microphone signal is increased relative to contributions of other microphone signals, but without completely eliminating the contributions of the other microphone signals. Alternatively, a switch to using only the first microphone signal (e.g., so that the second microphone signal does not contribute in any way to the noise-reduced signal) is also possible.

At 1122, an average signal is generated as an input to a high-pass filter (e.g., the HPF 360). The average signal corresponds to an average of all the microphone signals (e.g., the first microphone signal and the second microphone signal).

At 1124, the outputs of the low-pass filter and the high-pass filter are summed together (e.g., by the summation unit 370) to generate the noise-reduced signal. The use of a high-pass filter in combination with a low-pass filter to generate the noise-reduced signal is optional. In some embodiments, the noise-reduced signal is simply the microphone signal that has the lowest instantaneous magnitude. Thus, the noise-reduced signal can be generated using at least the first microphone signal, possibly only the first microphone signal. The noise-reduced signal generated in 1124 is then provided as an input for the processing in 1114 of FIG. 11A.

Figure 12:
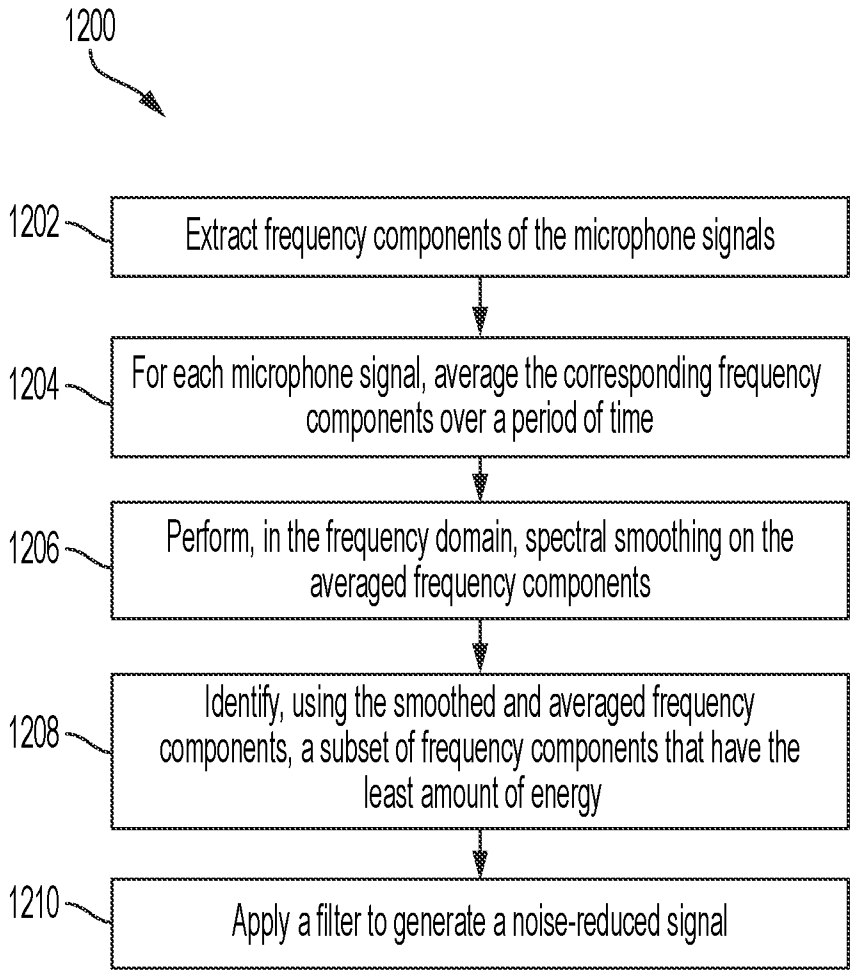
FIG. 12 is a flowchart illustrating a process for generating a noise-reduced signal according to certain embodiments.

FIG. 12 is a flowchart illustrating a process 1200 for generating a noise-reduced signal according to certain embodiments. The process 1200 can be used as an alternative to the processing depicted in FIG. 11B. The process 1200 can be performed by an output signal generator in conjunction with a noise detection system (e.g., implementations of the output signal generator 120 and the noise detection subsystem 130 in FIG. 1). The output signal generator and the noise detection system can be implemented in analog and/or digital correction circuitry. In some embodiments, the process 1200 may be performed, at least in part, through instructions executed by one or more processors (e.g., a digital signal processor) of a computer system.

At 1202, frequency components of a plurality of microphone signals generated using a microphone array are extracted. The extracting of the frequency components may involve, for example, applying a Discrete Fourier Transform (DFT) to digital versions of analog microphone signals from at least a first microphone and a second microphone in the microphone array. The output of the DFT may include, for each microphone signal, a spectral distribution across a range of frequencies. The frequencies may be divided into frequency bins, with a value assigned to each bin, where the value assigned to a bin indicates the amount of energy in a particular microphone signal at the frequency or range of frequencies to which the bin corresponds.

At 1204, the magnitudes in each of the many frequency bins extracted in 1202 are averaged over a period of time. An appropriate averaging of the frequency components produces, for each microphone signal, a set of average frequency components. The averaging of the frequency components reduces the number of outlier frequency components (e.g., false spikes in the frequency spectrum) and produces a spectral representation of each microphone signal that reflects the frequency behavior of the microphone signal over the period of time.

At 1206, spectral smoothing is performed, in the frequency domain, on the averaged frequency components. The spectral smooth further reduces the number of outlier frequency components, thereby producing a more accurate spectral representation of each microphone signal.

At 1208, a subset of smoothed and averaged frequency components are identified as having the least amount of energy. The subset can be identified, for example, by eliminating any frequency components whose values exceed a certain threshold. Values that exceed the threshold are usually values associated with non-acoustic stimuli, whereas values below the threshold tend to be associated with acoustic sources that should be captured (e.g., a person's voice).

At 1210, a noise-reduced signal is generated by applying a filter. The filter is generated based on the subset of frequency components identified in 1208 and operates to filter out frequency components not included in the identified subset. This produces a composite signal that can include contributions from all the microphone signals, but excludes portions of the microphone signals that are associated with non-acoustic stimuli.

The embodiments described above provide for reduced sensitivity to non-acoustic stimuli, and include various circuit implementations operable to detect and reduce the response to non-acoustic stimuli in a microphone array. Described below are embodiments directed to sensitivity matching between microphones in a microphone array. Sensitivity matching is useful in itself because the accuracy with which polar patterns are achieved through beamforming depends upon sensitivity matched microphones. Using signals from mismatched microphones for beamforming can result in polar patterns that deviate significantly from a desired polar pattern. The deviation is especially noticeable at lower frequencies. From example, a 1 decibel mismatch between a pair of microphones spaced 15.6 millimeters apart and whose desired response is a cardioid pattern may not produce much deviation from the desired cardioid pattern at frequencies ranging from approximately 3 kilohertz (kHz) down to about 800 Hz, but the polar pattern may become increasingly less like a cardioid below 800 Hz. At around 300 Hz and below, the resulting pattern would look completely circular, or omnidirectional.

In the absence of sensitivity matching, if the sensitivity mismatch between microphones is substantial, one solution would be to simply select the microphone with the lower sensitivity. However, selecting the microphone with the lower sensitivity is sub-optimal, whereas sensitivity matching enables an output audio signal to be generated with the best possible instantaneous signal-to-noise ratio relative to acoustic and non-acoustic stimuli.

Sensitivity matching can also be used to improve the performance of noise detection and noise reduction. In this sense, noise refers to any response to a non-acoustic stimulus. The example embodiments described above for detecting and reducing such responses include embodiments in which comparators are used to compare signals derived from microphone responses (e.g., amplified and rectified microphone signals, beamformed signals, and RMS signals). If the sensitivity of a microphone deviates significantly from the sensitivities of other microphones in a microphone array, this will reduce the accuracy of the inputs to the comparators, and will therefore have an adverse effect on the results on the comparisons. For instance, mismatches could result in false positives, false negatives, or incorrect amounts of cross fading.

Additionally, noise detection can be beneficial for sensitivity matching. For instance, in some embodiments, a sensitivity matching system (e.g., the system depicted in FIG. 13) is temporarily deactivated when non-acoustic stimuli are detected. Non-acoustic stimuli perturb microphones in a way that gives no information about the surrounding acoustic stimuli. Therefore, it would be advantageous to update sensitivity mismatch estimations based on microphone signals that are highly correlated, e.g., signals relating to the response to acoustic stimuli. Accordingly, in some embodiments, a noise detection system such as the system 200 in FIG. 2 could be used to control when to perform sensitivity matching.

Figure 13:
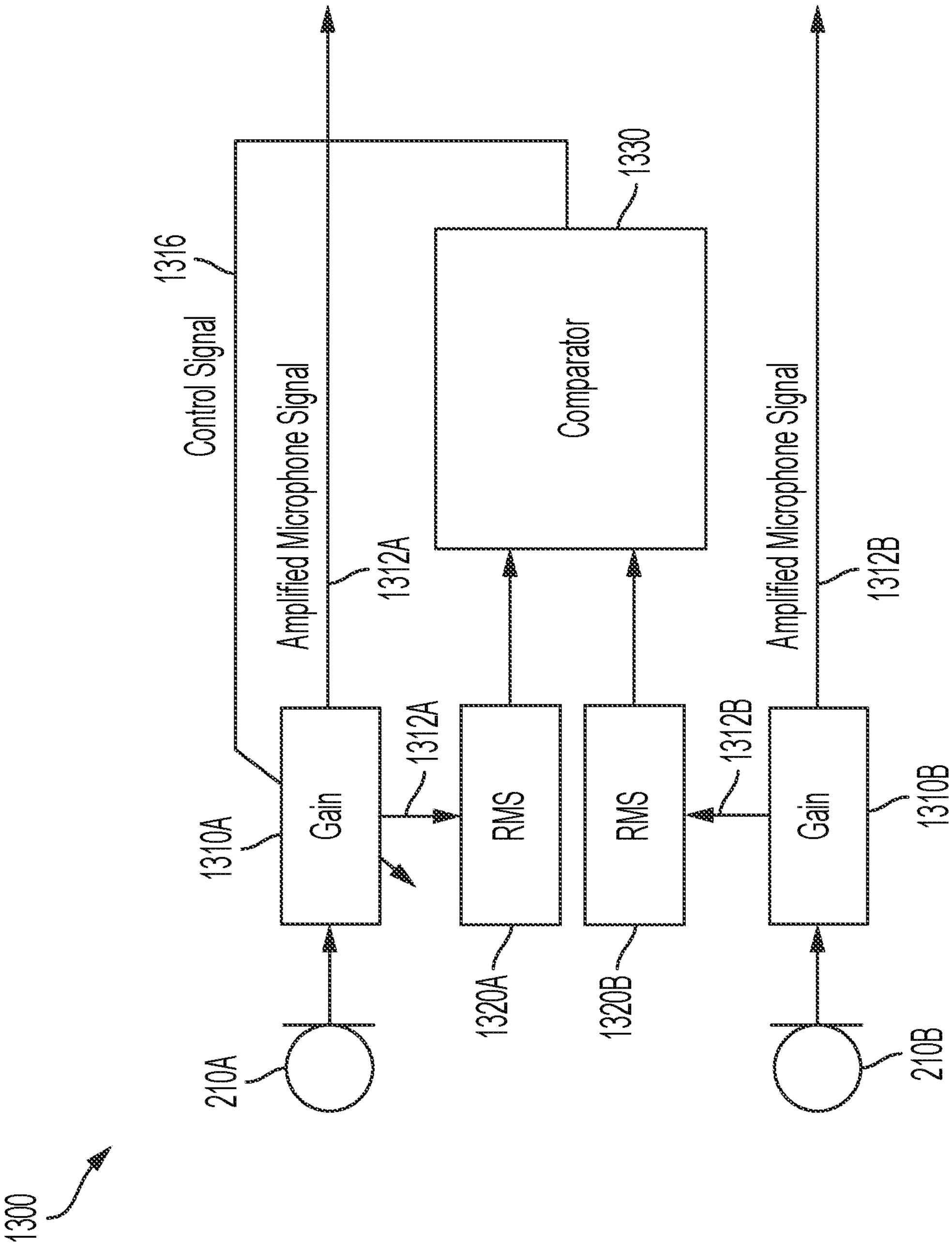
FIG. 13 is a simplified schematic of a system for sensitivity matching according to certain embodiments.

FIG. 13 is a simplified schematic of a system 1300 for sensitivity matching according to certain embodiments. The block elements depicted in FIG. 13 can be implemented in hardware, software, or a combination of hardware and software. The system 1300 is an implementation of the mismatch detection subsystem 140 in FIG. 1. The system 1300 includes a gain stage for each microphone in a microphone array. For example, as depicted in FIG. 13, the system 1300 can include a gain stage 1310A that amplifies the signal from the microphone 210A and a gain stage 1310B that amplifies the signal from the microphone 210B. The system 1300 further includes RMS units 1320A, 1320B and a comparator 1330. In the embodiment of FIG. 13, the microphone 210B is used as a reference microphone whose sensitivity dictates the amount of amplification for other microphones in the array (e.g., the microphone 210A).

Gain stage 1310A is configured to generate an amplified microphone signal 1312A. Gain stage 1310B is configured to generate an amplified microphone signal 1312B. The gain stages 1310A, 1310B can be integrated into or shared with the earlier described noise detection and reduction systems. For instance, the gain stages 1310A, 1310B may correspond to the gain stage 620 in FIG. 6, in which case the amplified microphone signals 1312A and 1312B would correspond to the amplified microphone signals 612A and 612B, respectively.

As shown in FIG. 13, the gain stage 1310A is adjustable to vary the amount of amplification applied to the signal from the microphone 210A. Each microphone in a microphone array can be coupled to a corresponding gain stage that is adjustable. In the embodiment of FIG. 13, the gain stage 310A is adjusted based on a control signal 1316 generated by the comparator 1330.

RMS units 1320A, 1320B supply RMS signals as inputs to the comparator 1330. The RMS unit 1320A generates an RMS signal corresponding to the RMS of the amplified microphone signal 1312A. Similarly, the RMS unit 1320B generates an RMS signal corresponding to the RMS of the amplified microphone signal 1312B. The RMS units 1320A, 1320B can be implemented in a similar manner to the RMS units described earlier, e.g., using a combination of rectification and low-pass filter units. The RMS signals generated by the RMS units 1320A, 1320B are generated over a relatively long time constant (e.g., a time window of 0.5 seconds or more). Using a long time constant ensures that sensitivity matching is robust even in the presence of directional acoustic stimuli whose sound arrives at different times for different positions along the microphone array. It is also very important to impose a limit for the time-rate-of-change of gain that 1310A will provide, to ensure stability, and mismatch estimation accuracy. Using a relatively long time constant, or integrating the amplified signal's magnitudes over a relatively long period of time, measures the true exposure to the sound field each microphone experienced. Even if the microphones are spaced further apart than the wavelengths included in the measurement, all microphones which are designed and placed to capture the sound from a talker will experience the same long term acoustic exposure. Therefore, as a consequence of using a relatively long time constant, the long-term RMS value of the amplified microphone signal 1312A will match that of the amplified microphone signal 1312B, which effectively makes the sensitivities of the microphones 210A, 210B identical or within a certain narrow range of each other. It is practical to achieve a settled mismatch of less than 0.005 dB.

The control signal 1316 indicates whether the RMS signal from the RMS unit 1320A is larger than the RMS signal from the RMS unit 1320B. If so, the value of the control signal 1316 will instruct the gain stage 1310A to decrease the amount of amplification applied to the signal from the microphone 210A. To ensure stability, the gain unit 1310A may only be allowed to respond by a present limit of gain per second (e.g., 0.2 dB per second), or by a present fraction of the measured mismatch per second (e.g., 5% of the mismatch per second). Similarly, if the control signal 1316 indicates that the RMS signal from the RMS unit 1320A is smaller than the RMS signal from the RMS unit 1320A, the control signal 1316 will instruct the gain stage 1310A to increase the amount of amplification applied to the signal from the microphone 210A.

The system 1300 can be operated over time (e.g., continuously or periodically activated) to ensure that the sensitivity of microphone 210A remains within a certain range of the sensitivity of the microphone 210B. The system 1300 is merely an example of a system for sensitivity matching. Variations of the system 1300 are possible. For example, in some embodiments, microphones 210A, 210B are adjusted in tandem based on the control signal 1316 (e.g., increasing the amplification of gain stage 1310A while decreasing the amplification of gain stage 1310B). In microphone arrays featuring three or more microphones, the gains can be adjusted in groups. For example, adjustment can be performed in a pairwise manner by comparing an RMS signal from a first microphone to an RMS signal from a second microphone to adjust the gain for the first microphone, and then comparing the RMS signal from the first microphone (updated after the gain for the first microphone has been adjusted) to an RMS signal from a third microphone to adjust the gain for the third microphone.

In some embodiments, the input to an RMS unit is filtered using a band-pass filter and/or low-pass filter in order to restrict the input to a low frequency range. Since sensitivity mismatch is usually not constant over frequency, and since low frequencies tend to require more precise sensitivity matching than higher frequencies, (e.g., for good low frequency differential beamforming performance) restricting the RMS input to the low frequency range would help ensure that any gain adjustments are performed using signals in the frequency range that needs the most correction.

Figure 14A:
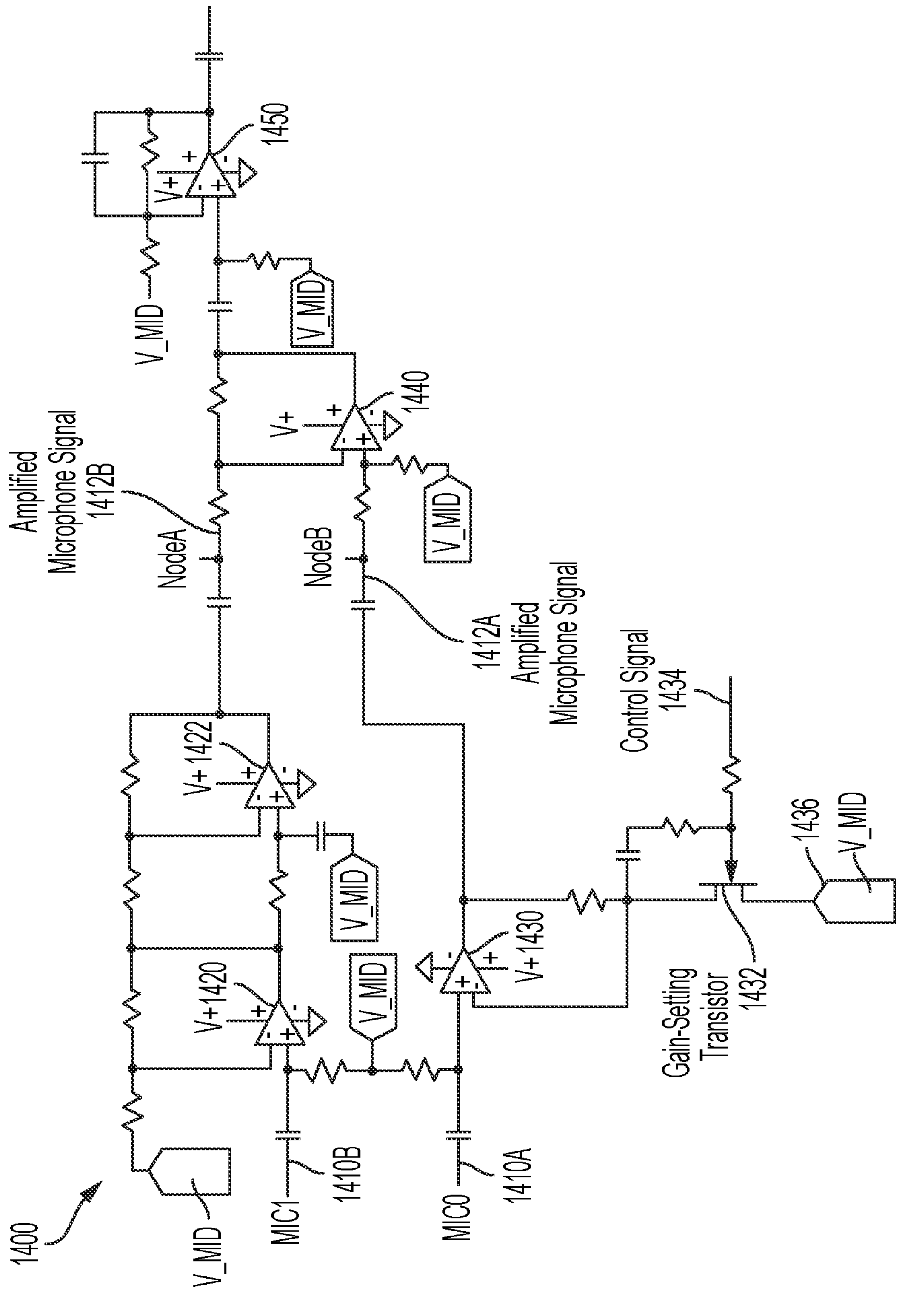
FIGS. 14A and 14B illustrate different portions of a circuit that can be used to implement the system in FIG. 13.

FIG. 14A illustrates a partial circuit 1400 that can be used to implement the system 1300 in FIG. 13. The circuit 1400 includes a set of op-amps configured to amplify microphone signals 1410A and 1410B to generate corresponding amplified microphone signals 1412A and 1412B. The amplified microphone signal 1412B corresponds to microphone signal 1412B after being amplified through an op-amp 1420 followed by an op-amp 1422. The amplified microphone signal 1412A corresponds to microphone signal 1412A after being amplified through an op-amp 1420. Op-amp 1440 performs the subtraction of amplified microphone signal 1412B from 1412A. This subtraction process creates the response to the gradient of acoustic pressure, which makes the microphone very directional. Therefore, the output of op-amp 1440 is a beamformed signal. Op-amp 1450 applies a frequency specific gain to the beamformed signal, output from op-amp 1440, to correct for the progressively potent acoustic short circuit resulting from the previously mentioned subtraction operation. This corrects for the on-axis response of the microphone array. Therefore, op-amp 1450 corresponds to the post filter for a differential beamformer.

As shown in FIG. 14A, the op-amp 1430 is operating as a voltage controlled amplifier (VCA) which uses a gain-setting transistor 1432, driven using a control signal 1434, to control the overall gain applied to microphone signal 1410A. In the embodiment of FIG. 14A, the transistor 1432 is a N-type JFET (N-type junction field effect transistor) configured to act as a variable resistor in the gain setting position of the circuit around op-amp 1430. The gate of the transistor 1432 is driven by the control signal 1434. There are also other methods which may be used in order to create a VCA without departing from the teachings of the present disclosure.

Figure 14B:
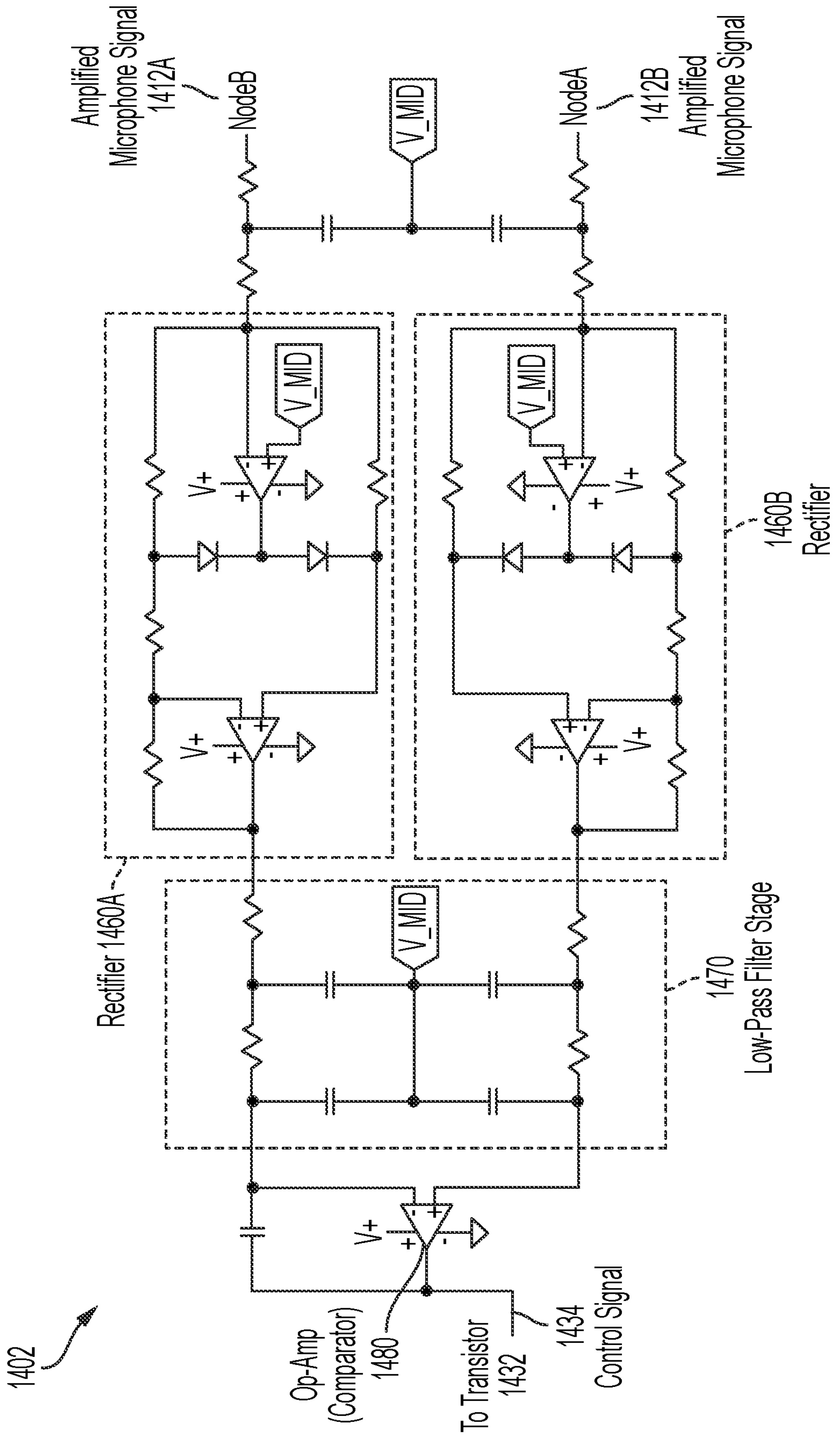

FIG. 14B illustrates a partial circuit 1402 that can be used to generate the control signal 1434 in FIG. 14A. The circuit 1402 includes a rectifier 1460A configured to rectify the amplified microphone signal 1412A, and a rectifier 1460B configured to rectify the amplified microphone signal 1412B. As shown in FIG. 14B, the rectifiers 1460A and 1460B can be implemented in a similar manner to the rectifiers 710A and 710B in FIG. 7.

The circuit 1402 further includes a low-pass filter stage 1470 and an op-amp 1480. The low-pass filter stage 1470 is configured to low-pass filter the outputs of the rectifiers 1460A, 1460B to generate a pair of inputs to the op-amp 1480. The op-amp 1480 serves as an integrating comparator and is configured to generate the control signal 1434 based on the integral of the difference between the low-pass filtered outputs of the rectifiers 1460A and 1460B.

Figure 15:
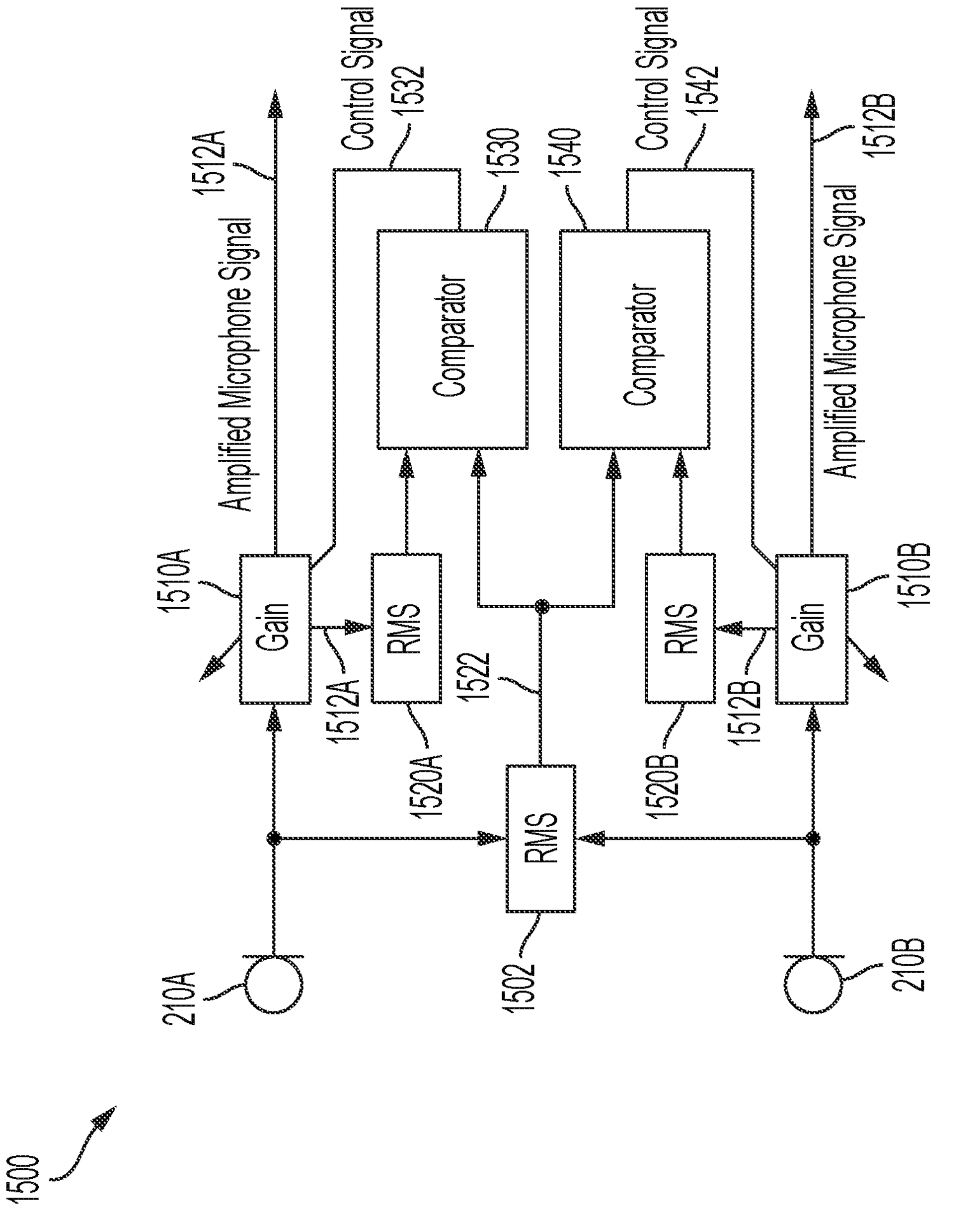
FIG. 15 is a simplified schematic of a system for sensitivity matching according to certain embodiments.

FIG. 15 is a simplified schematic of a system 1500 for sensitivity matching according to certain embodiments. The system 1500 is an implementation of the mismatch detection subsystem 140 in FIG. 1 and includes an RMS unit 1502, gain stages 1510A and 1510B, RMS units 1520A and 1520B, and comparators 1530 and 1540.

RMS unit 1502 is configured to generate an RMS signal 1512 corresponding to the RMS of the average of the signals from the microphones 210A and 210B.

Gain stages 1510A and 1510B are analogous to the gain stage 1310A in FIG. 13. The gain stage 1510A is configured to amplify the signal from the microphone 210A to generate an amplified microphone signal 1512A. The gain stage 1510B is configured to amplify the signal from the microphone 210B to generate an amplified microphone signal 1512B.

RMS units 1520A and 1520B are analogous to the RMS units 1320A and 1320B in FIG. 13 and generate RMS signals using the amplified microphone signals 1512A, 1512B.

Comparator 1530 is configured to compare the RMS signal generated by the RMS unit 1502 to the RMS signal generated by the RMS unit 1520A to output a control signal 1532 based on the difference between these RMS signals. Similarly, the comparator 1540 is configured to compare the RMS signal generated by the RMS unit 1502 to the RMS signal generated by the RMS unit 1520B to output a control signal 1542. Thus, each of the comparators 1530, 1540 operates to compare the same average RMS signal against an RMS signal derived from the signal of a respective microphone.

As shown in FIG. 15, the control signal 1532 is used to set the amount of amplification applied by the gain stage 1510A, and the control signal 1542 is used to set the amount of amplification applied by the gain stage 1510B. In this manner, the amplification applied to the signal from the microphone 210A is adjusted separately from the amplification applied to the signal from the microphone 210B, but both adjustments are based on the RMS of the average of each microphone in the entire microphone array. Matching each microphone to the average RMS of all microphones has several advantages. For instance, using the average RMS protects against incorrect gain adjustments due to problems with a reference microphone (e.g., plugged sound inlet, broken or damaged capsule). Another advantage is that the target sensitivity is more precise as a result of not being based solely on a single reference microphone. In particular, the absolute error in the target sensitivity is reduced by a factor of square root of N, where N equals the total number of microphones in the array. Additionally, using the RMS of the average of the microphone signals in combination with individually adjusting the gain for different microphones improves the resulting polar pattern by minimizing polar pattern degradation due to nonlinearity, which may be present in some amplification paths (e.g., nonlinear behavior of the gain stage 1510A), but not present in other amplification paths (e.g., gain stage 1510B).

Figure 16A:
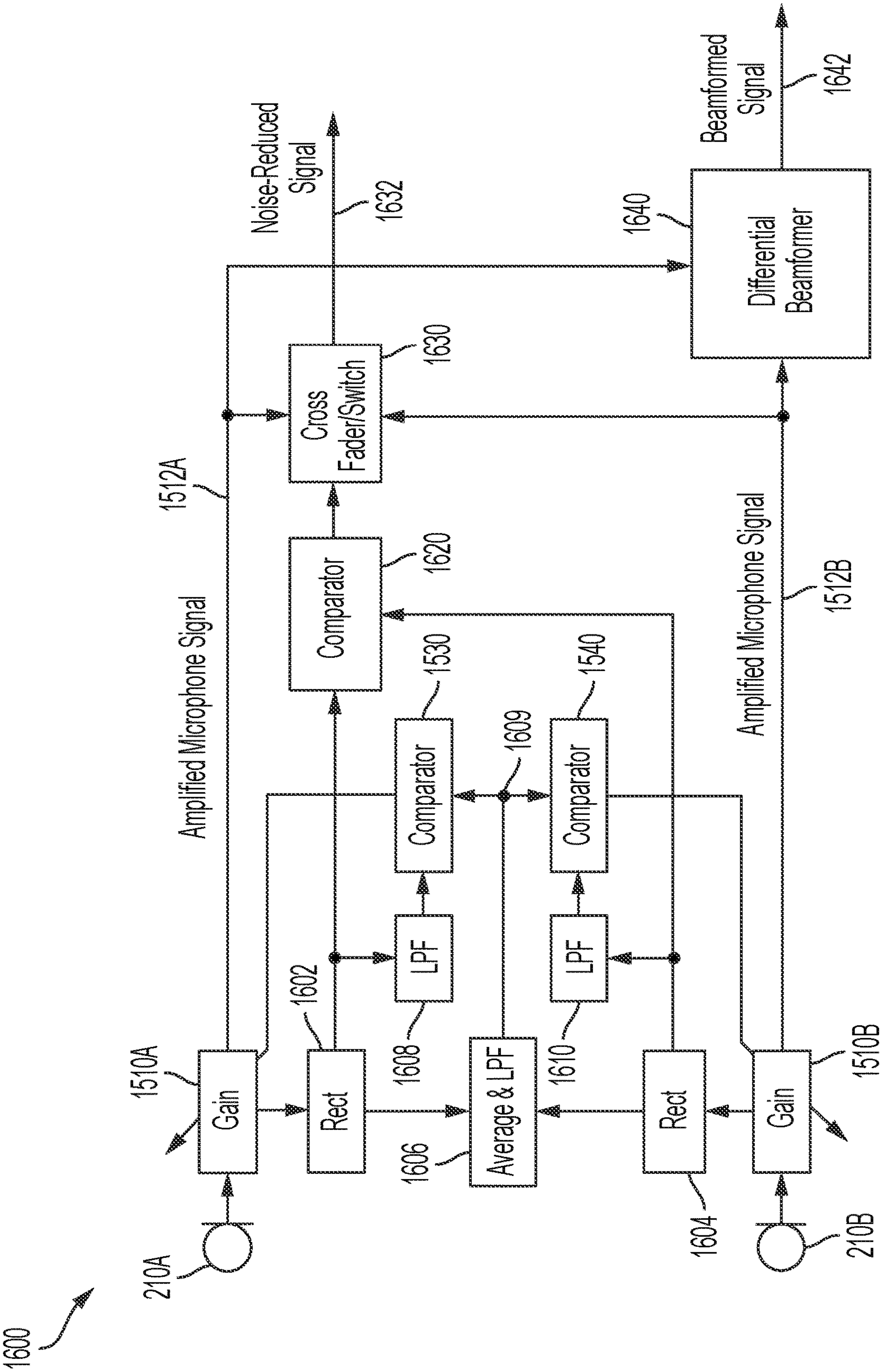
FIGS. 16A and 16B illustrate a system that provides for sensitivity matching, noise detection, and noise reduction according to certain embodiments.
Figure 16B:
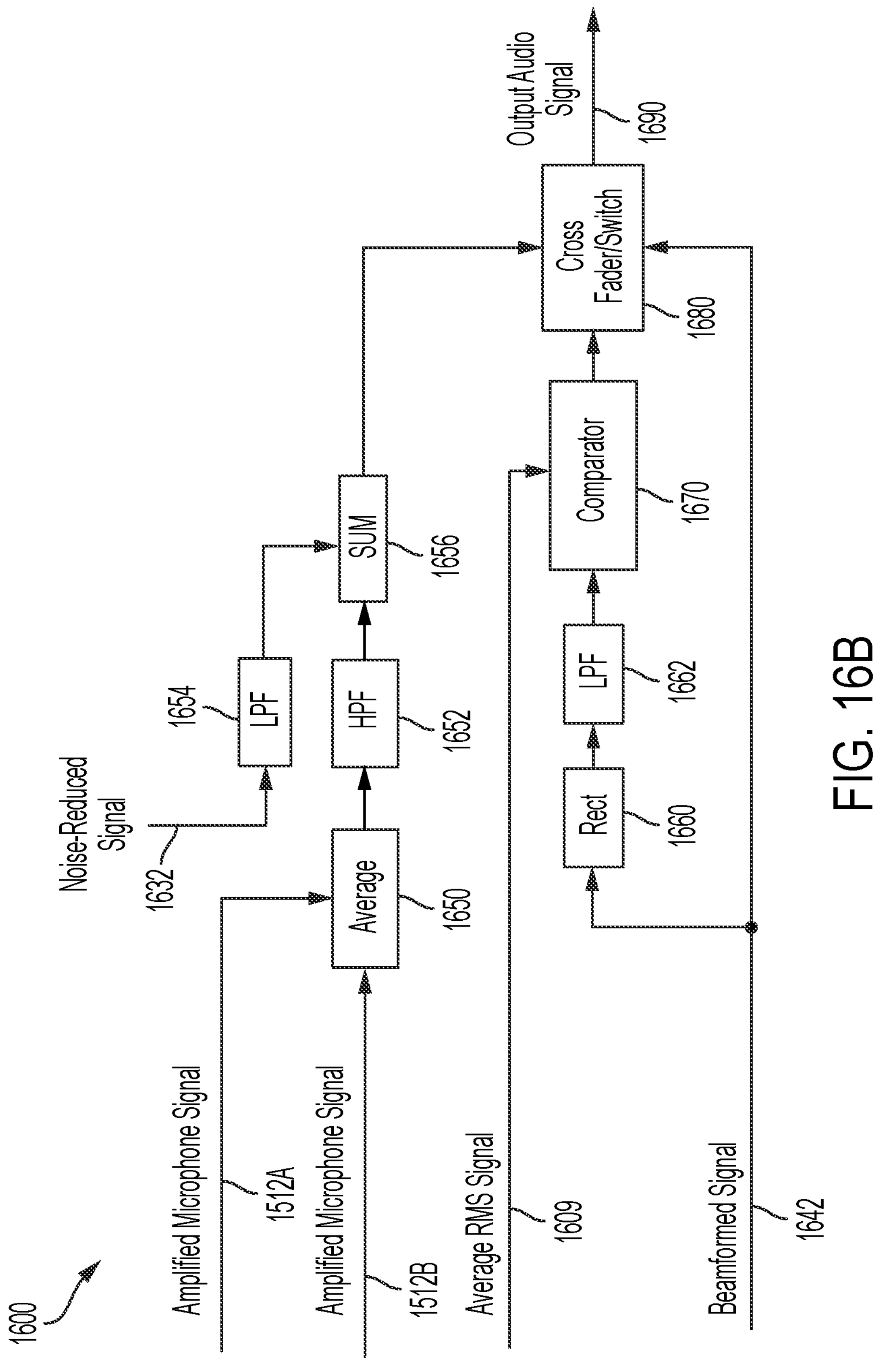

FIG. 16A is a partial schematic of a system 1600 that provides for sensitivity matching, noise detection, and noise reduction. The system 1600 provides the same sensitivity matching functionality described above in connection with the embodiment of FIG. 15. The system 1600 also provides the same noise detection and reduction functionality described above in connection with the embodiment of FIG. 5. Corresponding components from the system 1500 in FIG. 15 are shown with the same reference numerals. Another portion of the system 1600 is shown in FIG. 16B. The block elements depicted in FIGS. 16A and 16B can be implemented in hardware, software, or a combination of hardware and software.

As shown in FIG. 16A, the system 1600 includes the gain stages 1510A, 1510B and the comparators 1530, 1540 from FIG. 15. The system 1600 further includes a rectifier 1602 that operates on the output of the gain stage 1510A, a rectifier 1604 that operates on the output of the gain stage 1510B, and an averaging and low-pass filtering unit 1606 configured to average and low-pass filter the outputs of the rectifiers 1602, 1604. The RMS unit 1502 in FIG. 15 is implemented by the rectifier 1602 in combination with the rectifier 1604 and the averaging and low-pass filtering unit 1606. Similarly, the RMS unit 1520A is implemented by the rectifier 1602 in combination with an LPF 1608, and the RMS unit 1520B is implemented by the rectifier 1604 in combination with an LPF 1610.

The system 1600 further includes a comparator 1620, a cross fader/switch 1630, and a differential beamformer 1640. The comparator 1620 is configured to compare the outputs of the rectifiers 1602 and 1604, and is therefore analogous to the comparator 340 in FIGS. 3 and 5. The cross fader/switch 1630 generates a noise-reduced signal 1632 based on the output of the comparator 1620, and is therefore analogous to the cross fader/switch 350.

FIG. 16B is a partial schematic illustrating a portion of the system 1600 that operates on various signals produced by the system components shown in FIG. 16A. As shown in FIG. 16B, the system 1600 includes an averaging unit 1650 configured to average together the amplified microphone signal 1512A generated by the gain stage 1510A and the amplified microphone signal 1512B generated by the gain stage 1510B. The averaging unit 1650 is analogous to the averaging unit 310. The system 1600 further includes an HPF 1652, an LPF 1654, and a summation unit 1656, which are analogous to the HPF 360, the LPF 362, and the summation unit 370, respectively. The system 1600 further includes a rectifier 1660, an LPF 1662, a comparator 1670, and a cross fader/switch 1680, which are analogous to the rectifier 520, the LPF 530, the comparator 240, and the cross fader/switch 540, respectively. The cross fader/switch 1680 generates an output audio signal 1690.

Figure 17:
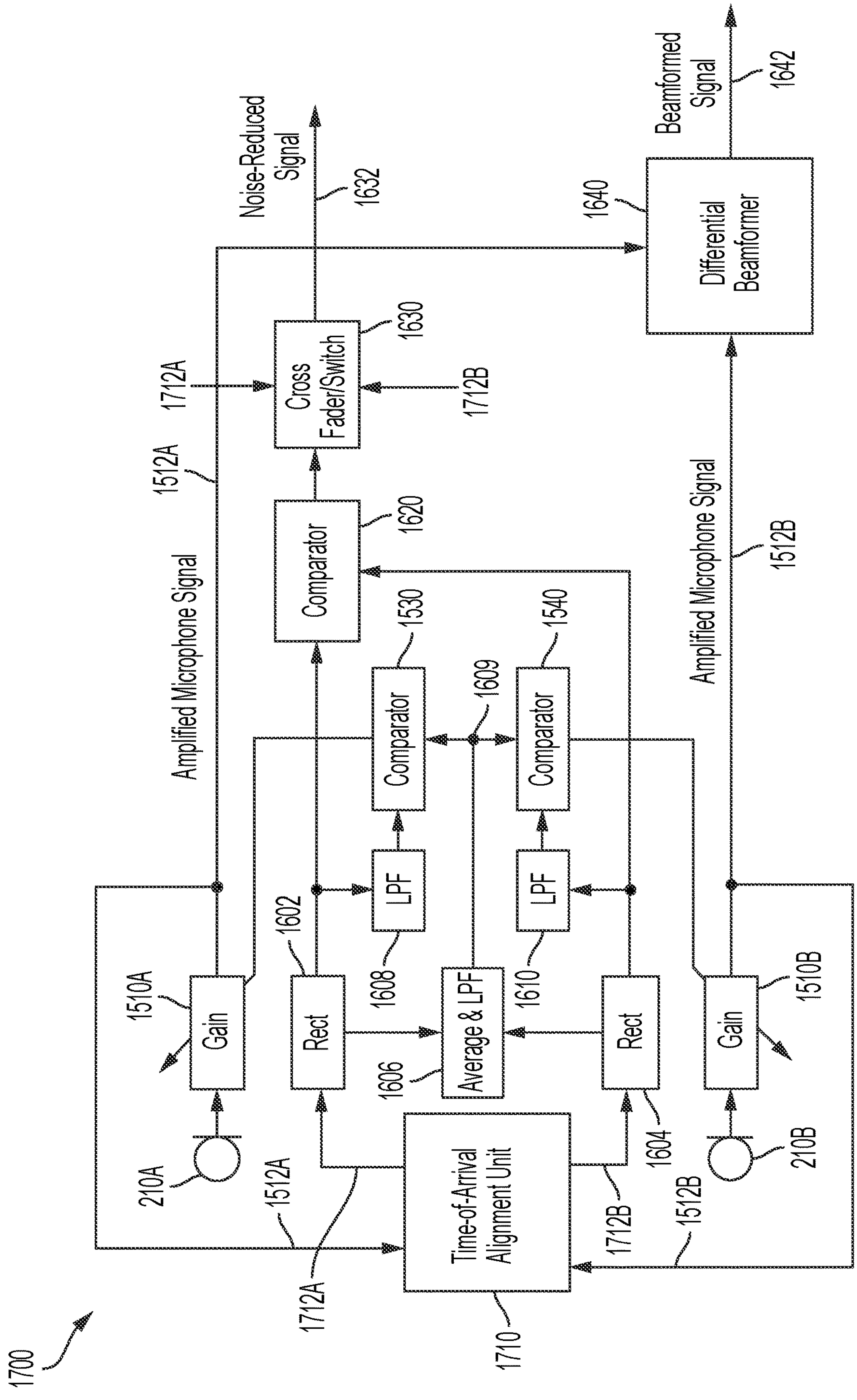
FIG. 17 illustrates an alternative to the embodiment depicted in FIG. 16A.

FIG. 17 illustrates a system 1700 that can be used as an alternative to the embodiment depicted in FIG. 16A. The system 1700 is similar to that which is shown in FIG. 16A, but includes a time-of-arrival alignment unit 1710 configured to generate time-aligned versions of the amplified microphone signals 1512A and 1512B as signals 1712A and 1712B, respectively.

In FIG. 17, the amplified microphone signals 1512A and 1512B are time-aligned by the time-of-arrival alignment unit 1710 to generate the signals 1712A and 1712B so that they are in phase with each other for sounds corresponding to an acoustic source of interest (e.g., speech from a talker). The time-of-arrival alignment unit 1710 can be configured to apply a static, but unique amount of delay to the outputs of each of the plurality of microphone sensors (e.g., 210A and 210B) such that the signals 1712A and 1712B are in phase with each other for sounds from the acoustic source of interest. The time-of-arrival alignment unit 1710 may calculate these unique delay values in real-time using adaptive processes to account for a moving acoustic source (e.g., when a talker is moving). In some embodiments, these delay values may be fixed without being updated in real-time.

Time-aligning microphone signals so that they are in phase with each other for sound from an acoustic source of interest is advantageous because it permits cross fading/switching (e.g., by the cross fader 1630) to be performed with less audible distortion being produced for the sound from the acoustic source of interest, i.e., the signal of interest. If the microphone signals are perfectly aligned and in phase, there should theoretically be zero distortion to the signal of interest. However, it should be noted that a certain amount of error in time alignment is generally acceptable. As a result, time-alignment does not need to be perfect, and a fixed delay can be used in conjunction with the embodiment shown in FIG. 17.

After being output from the time-of-arrival alignment unit 1710, the time-aligned signals 1712A and 1712B are sent into the rectifiers 1602 and 1604, respectively, and are subsequently subjected to the above-described processing for reduction of non-acoustic stimuli. As shown in FIG. 17, the inputs to the cross fader/switch 1630 are the time-aligned signals 1712A and 1712B instead of the amplified microphone signals 1512A and 1512B. Thus, in embodiments where compensated signals are generated by time-aligning microphone signals, cross fading can be performed between the compensated signals.

Figure 18:
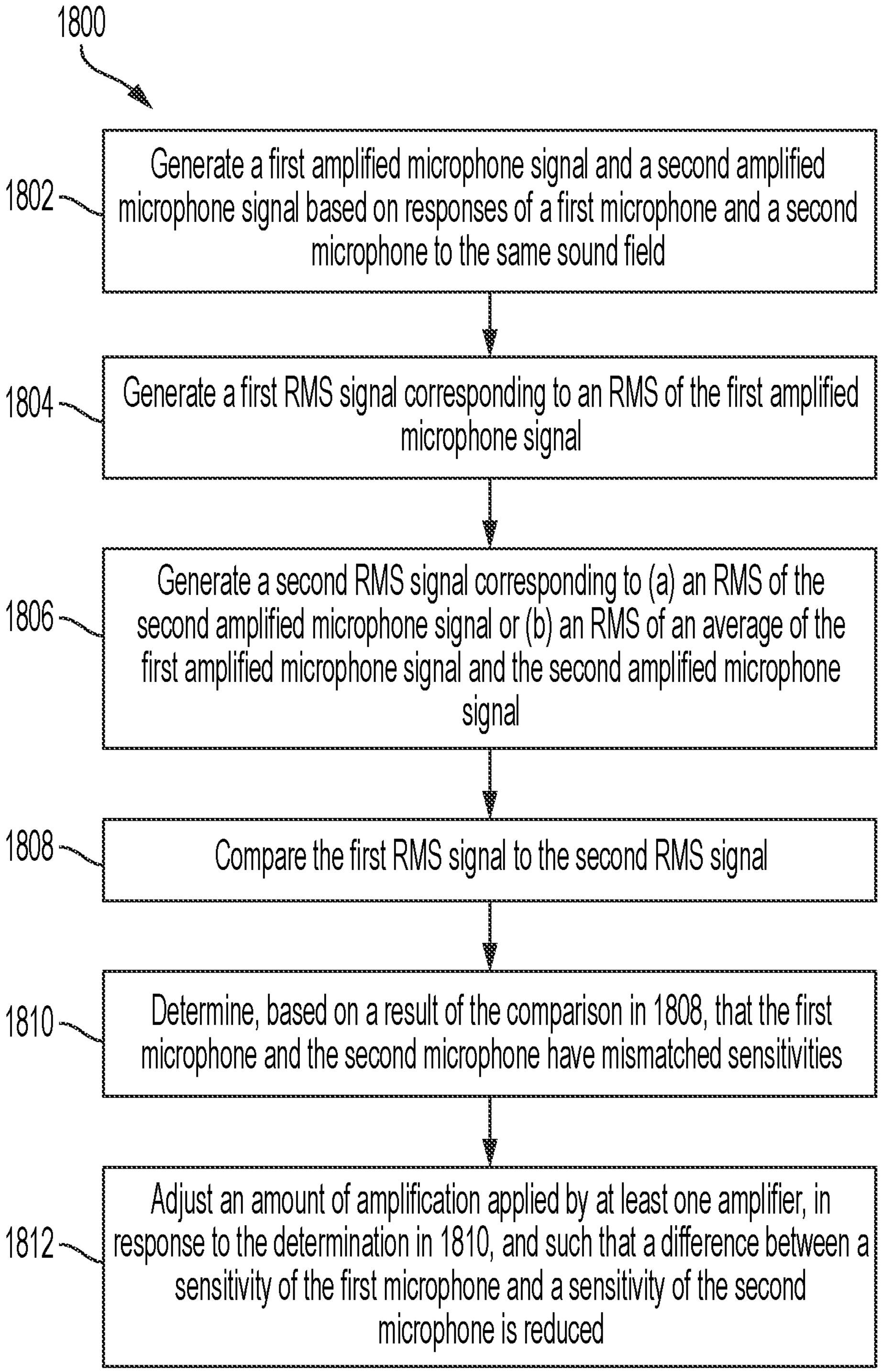
FIG. 18 is a flowchart illustrating a process for sensitivity matching in the time domain according to certain embodiments.

FIG. 18 is a flowchart illustrating a process 1800 for sensitivity matching in the time domain according to certain embodiments. The process 1800 can be performed by a mismatch detection system, for example, the mismatch detection subsystem 140 in FIG. 1 as implemented according to the embodiment in FIG. 13 or the embodiment in FIG. 15. In some embodiments, the process 1800 is performed through instructions executed by one or more processors of a computer system. The process 1800 is described with respect to two microphone signals. However, as with the methods described above, the techniques embodied in the process 1800 can be applied to any plurality of microphone signals and is therefore not restricted to a particular size microphone array.

At 1802, a first amplified microphone signal and a second amplified microphone signal are generated based on a first microphone signal and a second microphone, respectively. The first amplified microphone signal can be generated by inputting the first microphone signal into a first amplifier (e.g., the gain stage 1310A in FIG. 13). Similarly, the second microphone signal can be generated by inputting the second microphone signal into a second amplifier (e.g., the gain stage 1310B). The first microphone signal can represent a response of the first microphone to a sound field, the sound field being produced by an acoustic stimulus and a non-acoustic stimulus. The second microphone signal can represent a response of the second microphone to the same sound field.

At 1804, a first RMS signal is generated. The first RMS signal corresponds to an RMS of the first amplified microphone signal. For example, the first RMS signal can be the output of the RMS unit 1320A in FIG. 13 or the output of the RMS unit 1520A in FIG. 15.

At 1806, a second RMS signal is generated. The second RMS signal corresponds to either an RMS of the second amplified microphone signal (e.g., the output of the RMS unit 1320B) or an RMS of an average of the first amplified microphone signal and the second amplified microphone signal (e.g., the output of the RMS unit 1502). The time interval over which the first RMS signal and the second RMS signal are calculated can be selected to be sufficiently long enough the RMS signals are indicative of the degree of exposure to acoustic energy across the microphones (e.g., across all microphones in the microphone array).

Blocks 1804 and 1806 can be generalized to involve steps of calculating a first magnitude (e.g., a value of the first RMS signal) representing a running average of acoustic energy that the sound field exposes the first microphone to; and calculating a second magnitude (e.g., a value of the second RMS signal) representing a running average of acoustic energy that the sound field exposes the second microphone to.

At 1808, the first RMS signal is compared to the second RMS signal. The comparison in 1808 can be performed, for example, using the comparator 1330, the comparator 1530, or the comparator 1540. More generally, block 1808 may involve determining that the first microphone and the second microphone have mismatched sensitivities based on a difference between the first magnitude and the second magnitude discussed above. For example, the mismatch can be determined based on the ratio between a value of the first RMS signal and a value of the second RMS signal.

At 1810, a determination is made, based on a result of the comparison in 1808, that the first microphone and the second microphone have mismatched sensitivities. For instance, the microphones may be deemed to be mismatched if there is any difference between the first RMS signal and the second RMS signal, since the RMS in this case is a measurement of the long term exposure to the acoustic sound field, and the microphones are positioned close together in an array. Alternatively, the difference may be required to exceed a certain threshold before the microphones are deemed to be mismatched. If the comparison in 1808 is performed using a comparator, the determination can be reflected in the output of the comparator.

At 1812, an amount of amplification used by at least one amplifier (e.g., the amplifier that generates the first amplified microphone signal) is adjusted, in response to the determination in 1810, and such that a difference between a sensitivity of the first microphone and a sensitivity of the second microphone is reduced. The adjustment can, for example, be performed using the output of a comparator that performed the comparison in 1808 as a control signal. The control signal may be proportional to the difference between the first RMS signal and the second RMS signal, and may therefore indicate an extent to which the amount of amplification applied should be adjusted.

In some embodiments, a comparison is performed for each microphone in the microphone array. For example, in accordance with the embodiment of FIG. 15, a third RMS signal (e.g., the output of the RMS unit 1520B) could be generated which corresponds to the RMS of the second amplified microphone signal generated in 1802, and where the second RMS signal corresponds to the RMS of the average of the first amplified microphone signal and the second amplified microphone signal (e.g., the output of the RMS unit 1502). The second RMS signal could be compared to the third RMS signal to adjust an amount of amplification applied by another amplifier (e.g., the amplifier that generated the second amplified microphone signal).

In some embodiments, the adjusting of the amount of amplification applied by an amplifier is conditioned upon there being less than a threshold amount of noise present due to non-acoustic stimuli (e.g., as indicated by the responses of individual microphones in the microphone array to a sound field). Thus, the process 1800 may include an additional step of determining (e.g., using an implementation of the noise detection subsystem 130 in FIG. 1) an amount of noise present, caused by the response to non-acoustic stimuli, based on the first microphone signal and the second microphone signal, with the adjustment in 1812, and possibly additional steps such as the comparison in 1808, being performed only if there is less than a threshold amount of such noise.

Additionally, in certain embodiments, the rate at which the amount of amplification used to generate an amplified microphone signal can change is limited. Thus, the adjustment in 1812 may be subject to a time-rate-of-change limit to restrict the speed at which a change in gain is allowed to be carried out. For example, if the comparison in 1808 indicates that there is a mismatch ratio often (e.g., an RMS or other magnitude derived from the first microphone signal is ten times the RMS or other magnitude derived from the second microphone signal), then a control signal may be generated to instruct an amplifier to reduce the gain for the first microphone signal by a factor of ten. However, with a limit in place, the amplifier may be configured to permit a maximum change in gain of 0.2 dB per second, for example. The limit can be fixed or it may depend on the degree of mismatch. For example, the amplifier may be configured to permit a greater amount of amplification adjustment when the mismatch is higher than when the mismatch is lower. The processing in blocks 1802 to 1812 can be repeated to incrementally adjust the amount of amplification until the sensitivities of the first microphone and the second microphone are matched (e.g., when the RMS values of the microphones have converged to the same or approximately the same value).

The embodiments described above include various analog circuit implementations. It will be understood that sensitivity matching, noise detection, and noise reduction can also be performed using digital circuitry or a combination of analog and digital circuitry. For example, in some embodiments, mismatches between microphones are detected using a digital circuit that performs frequency domain analysis on microphone signals. As an alternative to comparing time-varying signals to determine differences in instantaneous signal magnitude, a frequency domain approach to sensitivity matching may involve extracting frequency components of microphone signals or signals derived therefrom, similar to the extraction described in connection with FIG. 12. Although analog circuitry can also be used to perform frequency domain analysis, such analysis can be implemented more readily using digital electronics. Thus, in some embodiments, a digital signal processor may be configured to perform sensitivity matching as well as detection and reduction of noise caused by non-acoustic stimuli.

Figure 19:
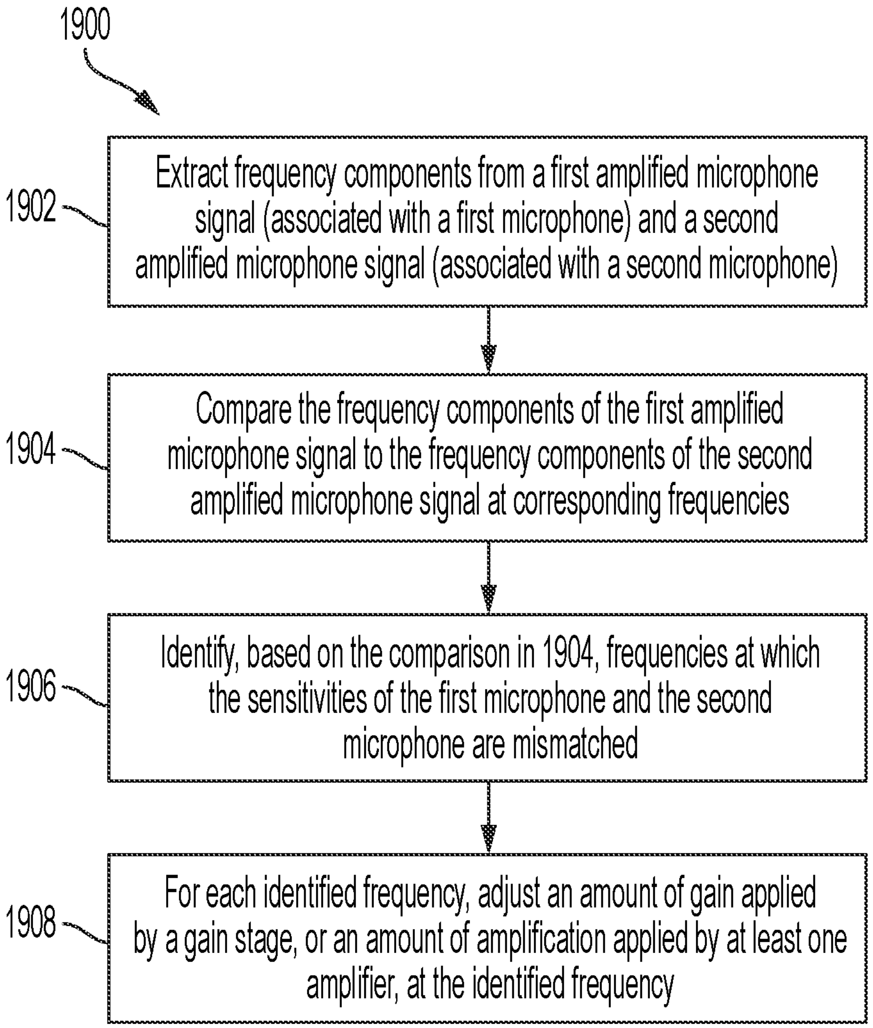
FIG. 19 is a flowchart illustrating a process for sensitivity matching in the frequency domain according to certain embodiments.

FIG. 19 is a flowchart illustrating a process 1900 for sensitivity matching in a frequency domain according to certain embodiments. The process 1900 can be performed by a mismatch detection system (e.g., the mismatch detection subsystem 140 in FIG. 1) implemented in analog and/or digital correction circuitry. In some embodiments, the process 1900 is performed through instructions executed by one or more processors of a computer system. As with the processes described above, the process 1900 can be applied to any plurality of microphone signals. The processing 1900 can be performed in combination with, or as an alternative to, time-based sensitivity matching. For example, in some embodiments, the processing depicted in FIG. 19 may be performed after performing the processing depicted in FIG. 18 in order to further reduce a mismatch between a first microphone and a second microphone.

At 1902, frequency components are extracted from a first amplified microphone signal and a second amplified microphone signal. The first amplified microphone signal is a result of amplifying a signal from a first microphone and is therefore associated with the first microphone. The second amplified microphone signal is a result of amplifying a signal from a second microphone and is therefore associated with the second microphone. The extraction in 1902 can be performed in a similar manner to the extraction in 1202 of FIG. 12 and produces, for each amplified microphone signal, a spectral representation of the amplified microphone signal. In particular, each frequency component may represent an average value of a corresponding frequency bin in a spectral representation of an amplified microphone signal. For instance, the amplified microphone signals may be captured over several frames, with each frame being a certain number of samples so that a frequency component can be computed as the average value of a particular frequency bin over N number of frames. Such averaging would provide a smooth, accurate, and conservative estimate of the exposure to the sound field for the particular frequency bin.

At 1904, the frequency components of the first amplified microphone signal to the frequency components of the second amplified microphone signal are compared at corresponding frequencies. For example, frequency components associated with the same frequency bin may be compared to determine how first microphone signal and the second microphone signal respond at a given frequency.

At 1906, frequencies at which the sensitivities of the first microphone and the second microphone are mismatched are identified, based on a result of the comparison in 1904. For example, it may be determined that the first microphone and the second microphone are mismatched at a particular frequency or at multiple frequencies across the entire frequency range of the spectral representations. A mismatch can be identified when the spectral representations have different energy levels at the same frequency, e.g., different values, or values that differ by more than a threshold, at the same frequency bin.

At 1908, for each identified frequency, the amount of gain applied by a gain stage, or the amount of amplification applied by at least one amplifier, at the identified frequency is adjusted. The adjustment can be performed, for example, by generating a separate control signal for each identified frequency. Similar to the limit discussed above in connection with FIG. 18 on the rate of change in the amount amplification/gain, the rate of change in 1908 can be limited on a per frequency or frequency bin basis.

The sensitivity matching techniques described above can be combined with techniques for detection of, and reduction of sensitivity to, non-acoustic stimuli. As mentioned above, an adjustment to the amount of amplification applied by an amplifier can be conditioned upon determining that the response to non-acoustic stimuli is less than a threshold amount. As another example, in some embodiments, after the amount of amplification applied by an amplifier is adjusted in response to detection of a sensitivity mismatch (e.g., based on the processing depicted in FIG. 18 or FIG. 19), non-acoustic stimuli can be detected using the same microphone signals that were used to detect the sensitivity mismatch, except that the microphone signals would have been updated to reflect more recent inputs to the microphones. For instance, after the adjustment in 1812 of FIG. 18, it may be determined that non-acoustic stimuli produced a greater perturbation in the first microphone signal than in the second microphone signal (e.g., as indicated by the instantaneous magnitudes of the first microphone signal and the second microphone signal) and, in response to this determination, the contribution of the first microphone signal to an output audio signal could be reduced.

Additionally, the sensitivity matching techniques described above can be extended to any size microphone array. For example, if the microphone array has eight microphones, the microphones could be matched all together or in groups, e.g., a first group consisting of the first three microphones (consecutively spaced apart at one end of the array), a second group consisting of the next three microphones, and a third group consisting of the last two microphones. When matching the sensitivities of three or more microphones, the amount of amplification for any particular microphone may be adjusted based on an average signal level, e.g., by comparing an amplified microphone signal from an individual microphone to an average of the amplified microphone signals of the entire array. Further, if matching is done in groups, beamforming may involve generating a separate beamformed signal for each group after matching is completed for all groups, then combining the beamformed signals (e.g., through summation) to produce an output audio signal. In some embodiments, crossover filtering is applied to divide each beamformed signal into multiple signals across different frequency ranges (e.g., a high frequency range and a low frequency range) before combining the divided beamformed signals.

Figure 20:
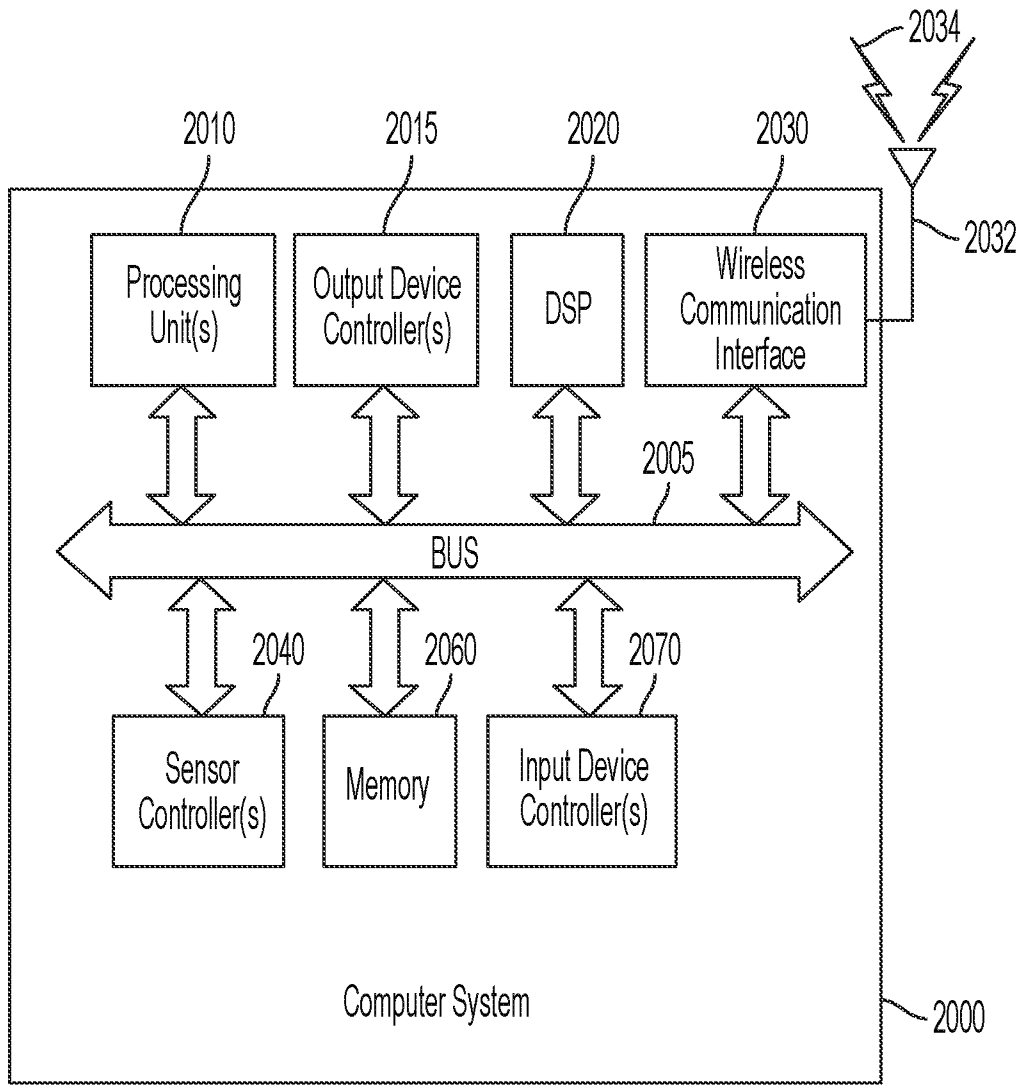
FIG. 20 is a simplified block diagram of a computer system usable for implementing one or more embodiments.

FIG. 20 is a simplified block diagram of a computer system 2000 usable for implementing one or more embodiments of the present disclosure. It should be noted that FIG. 20 is meant only to provide a generalized illustration of various components, any or all of which may be utilized as appropriate. It can be noted that, in some instances, components illustrated by FIG. 20 can be localized to a single physical device and/or distributed among various networked devices, which may be disposed at different physical locations.

The computer system 2000 is shown comprising hardware elements that can be electrically coupled via a bus 2005. However, the hardware elements can be communicatively coupled in other ways. In some embodiments, the computer system 2000 is located on a motor vehicle and the bus 2005 is a Controller Area Network (CAN) bus. The hardware elements may include a processing unit(s) 2010 which can include, without limitation, one or more general-purpose processors, one or more special-purpose processors (such as a digital signal processor (DSP), graphics acceleration processors, application specific integrated circuits (ASICs), and/or the like), and/or other processing structure or means. Some embodiments may have a separate DSP 2020, depending on desired functionality. The computer system 2000 also can include one or more input device controllers 2070, which can control without limitation an in-vehicle touch screen, a touch pad, microphone (e.g., individual microphones in a microphone array), button(s), dial(s), switch(es), and/or the like; and one or more output device controllers 2015, which can control without limitation a display, light emitting diode (LED), loudspeakers, and/or the like. Output device controllers 2015 may, in some embodiments, include controllers that individually control various sound contributing devices in the vehicle.

In certain embodiments, the computer system 2000 implements at least some of the sensitivity matching, noise detection, or noise reduction functionality described above. For example, detection of mismatched microphones or detection of non-acoustic stimuli can be performed by executing instructions on one or more processing units 2010 and/or the DSP 2020.

The computer system 2000 may also include a wireless communication interface 2030, which can include without limitation a modem, a network card, an infrared communication device, a wireless communication device, and/or a chipset (such as a Bluetooth device, an IEEE 802.11 device, an IEEE 802.16.4 device, a WiFi device, a WiMax device, cellular communication facilities including 4G, 5G, etc.), and/or the like. The wireless communication interface 2030 may permit data to be exchanged with a network, wireless access points, other computer systems, and/or any other electronic devices described herein. The communication can be carried out via one or more wireless communication antenna(s) 2032 that send and/or receive wireless signals 2034.

In certain embodiments, the wireless communication interface 2030 may transmit information for remote processing of microphone signals and/or receiving information used for local processing of microphone signals. Sensitivity matching, noise detection, and noise reduction can be performed at least in part, by a remote computer system. For instance, in some embodiments, the computer system 2000 may receive, from a remote computer system, historical information regarding the sensitivity of a microphone in a microphone array. The historical information can be based on measurements taken at the time that the microphone array is fully assembled, or any time thereafter, for example, periodic measurements taken in the absence of non-acoustic stimuli and over the lifetime of the microphone array. The computer system 2000 may use the historical information to identify deviations in the sensitivity of the microphone from past sensitivity and to determine an appropriate action to take, including determining when to adjust the gain for the microphone.

The computer system 2000 can further include sensor controller(s) 2040. Such controllers can control, without limitation, one or more microphones, one or more accelerometer(s), gyroscope(s), camera(s), RADAR sensor(s), LIDAR sensor(s), ultrasonic sensor(s), magnetometer(s), altimeter(s), microphone(s), proximity sensor(s), light sensor(s), and the like. With respect to a microphone array, the sensor controller(s) 2040 may include, for example, one or more controllers configured to selectively activate microphones in the array, e.g., by switching on or off a power supply to a particular microphone.

The computer system 2000 may further include and/or be in communication with a memory 2060. The memory 2060 can include, without limitation, local and/or network accessible storage, a disk drive, a drive array, an optical storage device, a solid-state storage device, such as a random access memory (RAM), and/or a read-only memory (ROM), which can be programmable, flash-updateable, and/or the like. Such storage devices may be configured to implement any appropriate data stores, including without limitation, various file systems, database structures, and/or the like.

The memory 2060 can also comprise software elements (not shown), including an operating system, device drivers, executable libraries, and/or other code embedded in a computer-readable medium, such as one or more application programs, which may comprise computer programs provided by various embodiments, and/or may be designed to implement methods, and/or configure systems, provided by other embodiments, as described herein. In an aspect, then, such code and/or instructions can be used to configure and/or adapt a general purpose computer (or other device) to perform one or more operations in accordance with the described methods. The memory 2060 may further comprise storage for data used by the software elements. For instance, memory 2060 may store configuration information (e.g., gain offset values) indicating, for each microphone in a microphone array, how much to adjust an amplifier coupled to the microphone.

In some embodiments, the system 2000 (e.g., and/or any system described herein or other suitable computing system or processor) may be configured to receive sensor data indicating location information of a user device. The sensor data may be received by any suitable sensor configured to detect or sense a location and angle of the user device relative to a microphone array, such as the microphone array 110 or any other microphone array. The microphone array 110 may be disposed on an exterior portion of a vehicle or in any suitable location. The user device may include any suitable user device or combination of devices including at least one of a key fob, a mobile computing device, a digital tag, a smart card, and/or any other suitable user device.

The system 2000 may receive a first microphone signal generated based on a response of a first microphone in the microphone array 110 to an acoustic stimulus and a non-acoustic stimulus. The first microphone may include any microphone described herein any/or any other suitable microphone. The system 2000 may receive a second microphone signal generated based on a response of a second microphone in the microphone array 110 to the acoustic stimulus and the non-acoustic stimulus. The second microphone may include any microphone described herein any/or any other suitable microphone. The acoustic stimulus may correspond to speech of the user associated with the user device and may include, for example, voice commands or other suitable speech.

The system 2000 may generate a beamformed signal by combining the first microphone signal and the second microphone signal using differential beamforming. The system 2000 may adjust, by adding a delay to or otherwise suitably adjusting, the first microphone signal based on the location information of the user device. The system 2000 may adjust, by adding a delay to or otherwise suitably adjusting, the second microphone signal based on the location information of the user device. The adjusted first compensated signal and the adjusted second compensated signal may be in phase with respect to the acoustic stimulus.

The system 2000 may generate a first compensated signal based on the adjusted first microphone signal. The system 2000 may generate a second compensated signal based on the adjusted second microphone signal. The system 2000 may generate an average signal corresponding to an average of the first compensated signal and the second compensated signal. The first compensated signal and the second compensated signal may have equal magnitude and phase relationship to the acoustic stimulus.

The system 2000 may detect a presence of the non-acoustic stimulus in the first compensated signal and the second compensated signal, by (i) comparing a first signal to a second signal, where the first signal is at least one of the beamformed signal and a signal derived from the beamformed signal, and where the second signal is at least one of the average signal and a signal derived from the average signal, and (ii) determining, based on a result of the comparing, that an instantaneous magnitude of the first signal is greater than that of the second signal.

The system 2000 may, responsive to the determining that the instantaneous magnitude of the first signal is greater than that of the second signal, generate an output audio signal by switching or cross fading between the beamformed signal and a noise-reduced signal such that a contribution of the noise-reduced signal to the output audio signal is increased and a contribution of the beamformed signal to the output audio signal is decreased. In some embodiments, the system 2000 may determine that the first compensated signal has the least instantaneous magnitude among a set of compensated signals corresponding to each of the microphones in the microphone array. In some embodiments, the system 2000 may generate the noise-reduced signal by switching to the first compensated signal such that the second compensated signal does not contribute to the noise-reduced signal.

In some embodiments, the system 2000 may generate the noise-reduced signal by switching or cross fading between the first compensated signal and the second compensated signal, such that a contribution of the first compensated signal to an input of a low-pass filter is increased based on the first compensated signal having a lower instantaneous magnitude than the second compensated signal. The system 2000 may input the average signal to a high-pass filter; and summing an output of the low-pass filter with an output of the high-pass filter to generate the noise-reduced signal.

The system 2000 may repeatedly determine, at regular intervals, which of the first compensated signal and the second compensated signal has a lower instantaneous magnitude. The system 2000 may generate the noise-reduced signal by crossfading between the first compensated signal and the second compensated signal such that whichever of the first compensated signal and the second compensated signal has a lower instantaneous magnitude at any particular interval is favored.

In some embodiments, the system 2000 may determine which of the first compensated signal and the second compensated signal has a lower instantaneous magnitude by generating a first magnitude value by rectifying the first compensated signal, generating a second magnitude value by rectifying the second compensated signal, and comparing the first magnitude value to the second magnitude value to identify which of the first compensated signal and the second compensated signal has a lower instantaneous magnitude.

In some embodiments, the system 2000 may generate the first signal as a root mean square of the beamformed signal. The system 2000 may generate the second signal as a root mean square of the average signal.

Figure 21A:
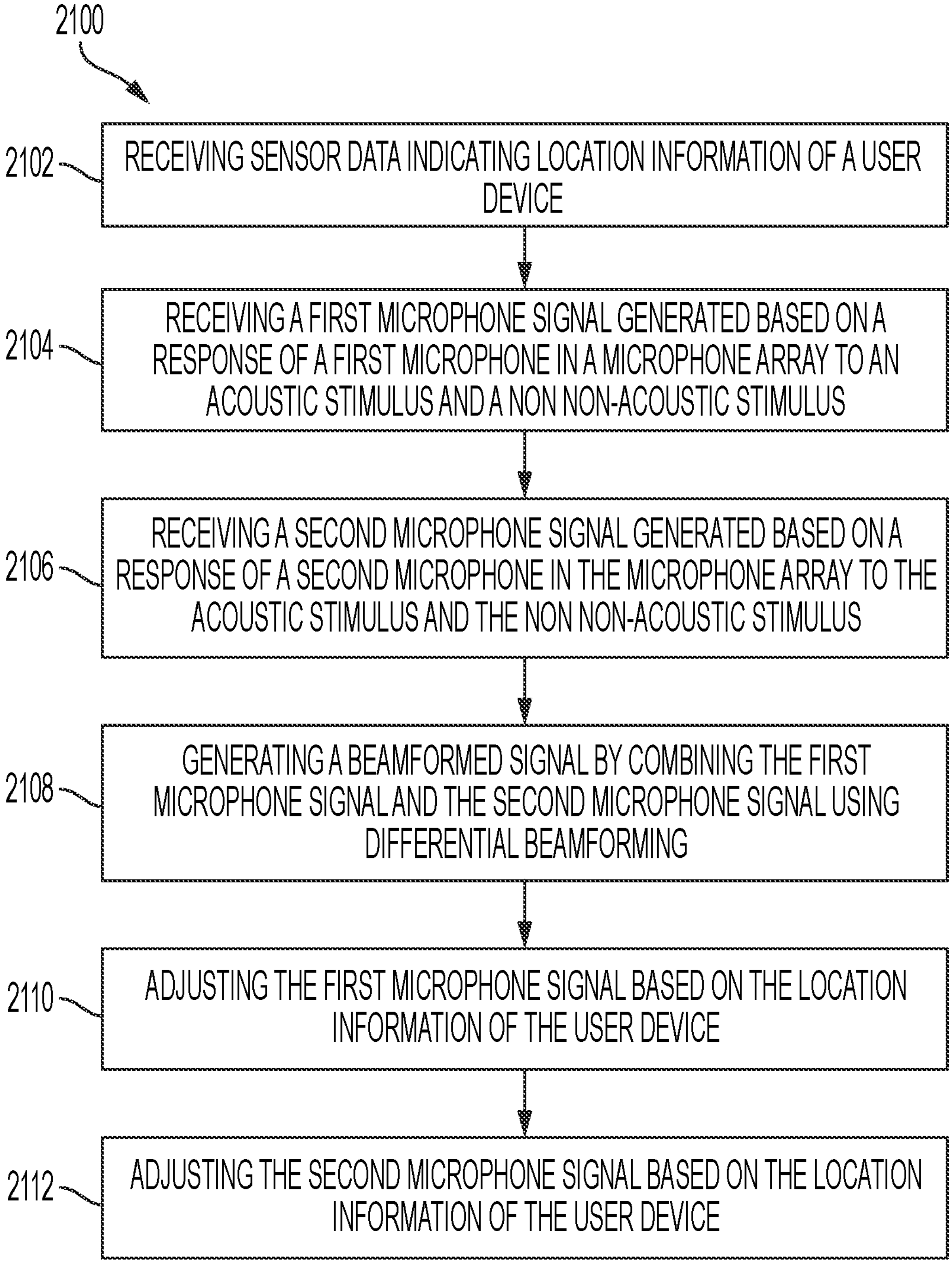
FIGS. 21A and 21B are a flowchart illustrating a process for identifying a speaker and for detecting and reducing sensitivity to non-acoustic stimuli according to certain embodiments.
Figure 21B:
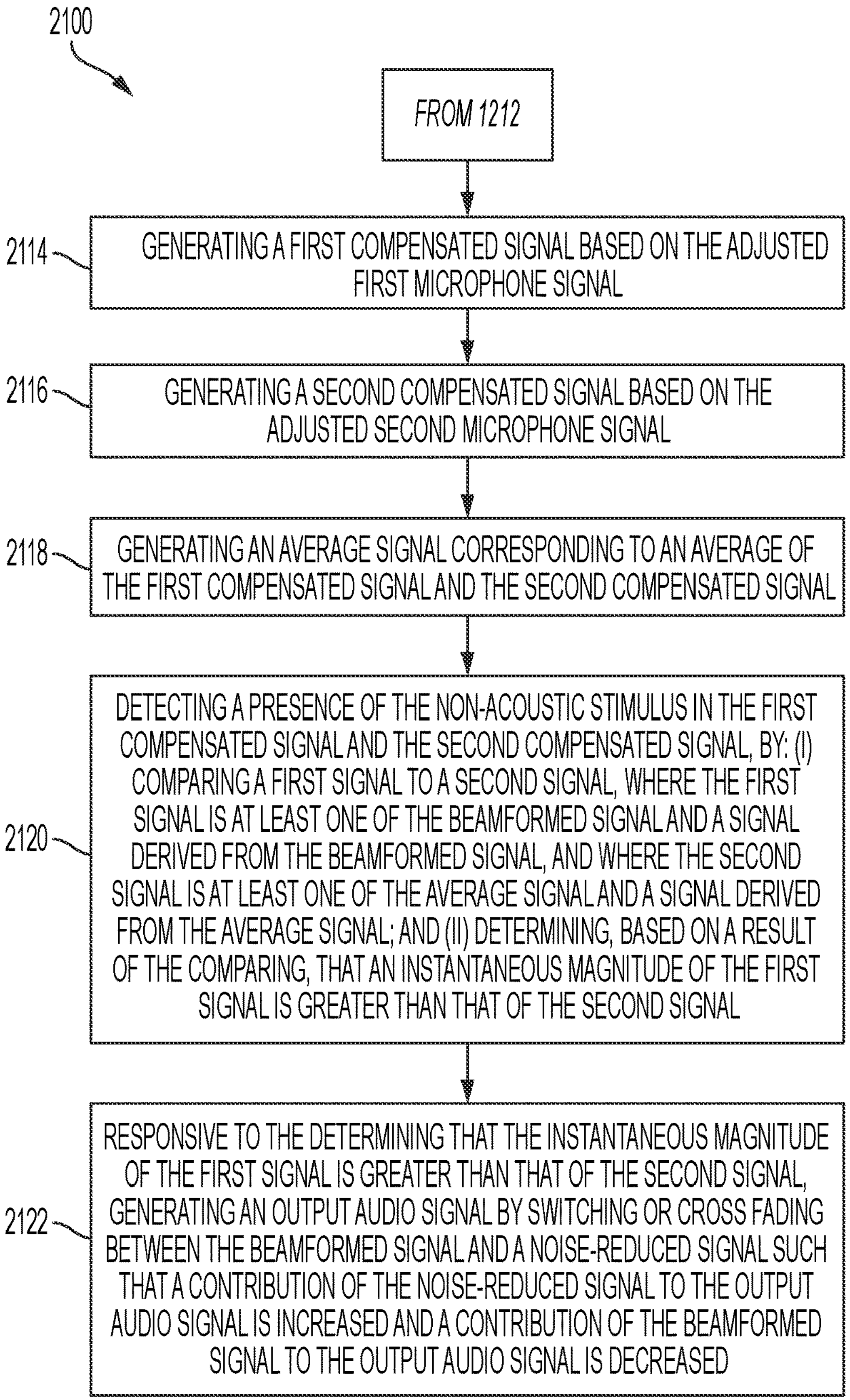

FIGS. 21A and 21B are flowcharts illustrating a process 2100 for identifying a speaker and for detecting and reducing sensitivity to non-acoustic stimuli according to certain embodiments. The process 2100 can be performed using an output signal generator in conjunction with a noise detection system (e.g., implemented according to the embodiment in FIG. 2 or the embodiment in FIG. 5). In some embodiments, the process 2100 is performed, at least in part, through instructions executed by one or more processors (e.g., a digital signal processor) of a computer system, such as the computer system 2000.

At 2102, the process 2100 receives sensor data indicating location information of a user device.

At 2104, the process 2100 receives a first microphone signal generated based on a response of a first microphone in a microphone array to an acoustic stimulus and a non-acoustic stimulus.

At 2106, the process 2100 receives a second microphone signal generated based on a response of a second microphone in the microphone array to the acoustic stimulus and the non-acoustic stimulus.

At 2108, the process 2100 generates a beamformed signal by combining the first microphone signal and the second microphone signal using differential beamforming.

At 2110, the process 2100 adjusts the first microphone signal based on the location information of the user device.

At 2112, the process 2100 adjusts the second microphone signal based on the location information of the user device.

At 2114, the process 2100 generates a first compensated signal based on the adjusted first microphone signal.

At 2116, the process 2100 generates a second compensated signal based on the adjusted second microphone signal.

At 2118, the process 2100 generates an average signal corresponding to an average of the first compensated signal and the second compensated signal.

At 2120, the process 2100 detects a presence of the non-acoustic stimulus in the first compensated signal and the second compensated signal, by (i) comparing a first signal to a second signal, where the first signal is at least one of the beamformed signal and a signal derived from the beamformed signal, and where the second signal is at least one of the average signal and a signal derived from the average signal, and (ii) determining, based on a result of the comparing, that an instantaneous magnitude of the first signal is greater than that of the second signal.

At 2122, the process 2100, responsive to the determining that the instantaneous magnitude of the first signal is greater than that of the second signal, generates an output audio signal by switching or cross fading between the beamformed signal and a noise-reduced signal such that a contribution of the noise-reduced signal to the output audio signal is increased and a contribution of the beamformed signal to the output audio signal is decreased.

Clause 1. A method comprising: receiving sensor data indicating location information of a user device; receiving a first microphone signal generated based on a response of a first microphone in a microphone array to an acoustic stimulus and a non-acoustic stimulus; receiving a second microphone signal generated based on a response of a second microphone in the microphone array to the acoustic stimulus and the non-acoustic stimulus; generating a beamformed signal by combining the first microphone signal and the second microphone signal using differential beamforming; adjusting the first microphone signal based on the location information of the user device; adjusting the second microphone signal based on the location information of the user device; generating a first compensated signal based on the adjusted first microphone signal; generating a second compensated signal based on the adjusted second microphone signal; generating an average signal corresponding to an average of the first compensated signal and the second compensated signal; detecting a presence of the non-acoustic stimulus in the first compensated signal and the second compensated signal, by: comparing a first signal to a second signal, wherein the first signal is at least one of the beamformed signal and a signal derived from the beamformed signal, and wherein the second signal is at least one of the average signal and a signal derived from the average signal; and determining, based on a result of the comparing, that an instantaneous magnitude of the first signal is greater than that of the second signal; and, responsive to the determining that the instantaneous magnitude of the first signal is greater than that of the second signal, generating an output audio signal by switching or cross fading between the beamformed signal and a noise-reduced signal such that a contribution of the noise-reduced signal to the output audio signal is increased and a contribution of the beamformed signal to the output audio signal is decreased.

Clause 2. The method of any of the clauses herein, wherein the adjusted first compensated signal and the adjusted second compensated signal are in phase with respect to the acoustic stimulus.

Clause 3. The method of any of the clauses herein, wherein the user device includes at least one of a key fob, a mobile computing device, a digital tag, and a smart card.

Clause 4. The method of any of the clauses herein, wherein the acoustic stimulus corresponds to speech of a user associated with the user device.

Clause 5. The method of any of the clauses herein, further comprising generating the first signal as a root mean square of the beamformed signal.

Clause 6. The method of any of the clauses herein, further comprising generating the second signal as a root mean square of the average signal.

Clause 7. The method of any of the clauses herein, further comprising: repeatedly determining, at regular intervals, which of the first compensated signal and the second compensated signal has a lower instantaneous magnitude; and generating the noise-reduced signal by crossfading between the first compensated signal and the second compensated signal such that whichever of the first compensated signal and the second compensated signal has a lower instantaneous magnitude at any particular interval is favored.

Clause 8. The method of any of the clauses herein, wherein determining which of the first compensated signal and the second compensated signal has a lower instantaneous magnitude comprises: generating a first magnitude value by rectifying the first compensated signal; generating a second magnitude value by rectifying the second compensated signal; and comparing the first magnitude value to the second magnitude value to identify which of the first compensated signal and the second compensated signal has a lower instantaneous magnitude.

Clause 9. The method of any of the clauses herein, further comprising determining that the first compensated signal has the least instantaneous magnitude among a set of compensated signals corresponding to each of the microphones in the microphone array.

Clause 10. The method of any of the clauses herein, wherein generating the noise-reduced signal comprises: switching or cross fading between the first compensated signal and the second compensated signal such that a contribution of the first compensated signal to an input of a low-pass filter is increased based on the first compensated signal having a lower instantaneous magnitude than the second compensated signal; inputting the average signal to a high-pass filter; and summing an output of the low-pass filter with an output of the high-pass filter to generate the noise-reduced signal.

Clause 11. The method of any of the clauses herein, wherein generating the noise-reduced signal comprises switching to the first compensated signal such that the second compensated signal does not contribute to the noise-reduced signal.

Clause 12. The method of any of the clauses herein, wherein the first compensated signal and the second compensated signal have equal magnitude and phase relationship to the acoustic stimulus.

Clause 13. The method of any of the clauses herein, wherein adjusting the first microphone signal includes adding a delay to the first microphone signal based on the location information of the user device.

Clause 14. The method of any of the clauses herein, wherein adjusting the second microphone signal includes adding a delay to the second microphone signal based on the location information of the user device.

Clause 15. The method of any of the clauses herein, wherein the location information of the user device includes at least a distance between the microphone array and the user device and an angle of the user device relative to the microphone array.

Clause 16. A system comprising: a processor; and a memory include instructions that, when executed by the processor, cause the processor to: receive sensor data indicating location information of a user device; receive a first microphone signal generated based on a response of a first microphone in a microphone array to an acoustic stimulus and a non-acoustic stimulus; receive a second microphone signal generated based on a response of a second microphone in the microphone array to the acoustic stimulus and the non-acoustic stimulus; generate a beamformed signal by combining the first microphone signal and the second microphone signal using differential beamforming; adjust the first microphone signal based on the location information of the user device; adjust the second microphone signal based on the location information of the user device; generate a first compensated signal based on the adjusted first microphone signal; generate a second compensated signal based on the adjusted second microphone signal; generate an average signal corresponding to an average of the first compensated signal and the second compensated signal; detect a presence of the non-acoustic stimulus in the first compensated signal and the second compensated signal, by: comparing a first signal to a second signal, wherein the first signal is at least one of the beamformed signal and a signal derived from the beamformed signal, and wherein the second signal is at least one of the average signal and a signal derived from the average signal; and determining, based on a result of the comparing, that an instantaneous magnitude of the first signal is greater than that of the second signal; and, responsive to the determining that the instantaneous magnitude of the first signal is greater than that of the second signal, generate an output audio signal by switching or cross fading between the beamformed signal and a noise-reduced signal such that a contribution of the noise-reduced signal to the output audio signal is increased and a contribution of the beamformed signal to the output audio signal is decreased.

Clause 17. The system of any of the clauses herein, wherein the user device includes at least one of a key fob, a mobile computing device, a digital tag, and a smart card, and wherein the acoustic stimulus corresponds to speech of a user associated with the user device.

Clause 18. The system of any of the clauses herein, wherein adjusting the first microphone signal includes adding a delay to the first microphone signal based on the location information of the user device and adjusting the second microphone signal includes adding a delay to the second microphone signal based on the location information of the user device.

Clause 19. The system of any of the clauses herein, wherein the location information of the user device includes at least a distance between the microphone array and the user device and an angle of the user device relative to the microphone array.

Clause 20. A computer-readable storage medium containing instructions that, when executed by one or more processors of a computer, cause the one or more processors to: receive sensor data indicating location information of a user device; receive a first microphone signal generated based on a response of a first microphone in a microphone array to an acoustic stimulus and a non-acoustic stimulus; receive a second microphone signal generated based on a response of a second microphone in the microphone array to the acoustic stimulus and the non-acoustic stimulus; generate a beamformed signal by combining the first microphone signal and the second microphone signal using differential beamforming; adjust the first microphone signal based on the location information of the user device; adjust the second microphone signal based on the location information of the user device; generate a first compensated signal based on the adjusted first microphone signal; generate a second compensated signal based on the adjusted second microphone signal; generate an average signal corresponding to an average of the first compensated signal and the second compensated signal; detect a presence of the non-acoustic stimulus in the first compensated signal and the second compensated signal; and generate an output audio signal by one of switching and cross fading between the beamformed signal and a noise-reduced signal such that a contribution of the noise-reduced signal to the output audio signal is increased and a contribution of the beamformed signal to the output audio signal is decreased.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

The word "example" is used herein to mean serving as an example, instance, or illustration. Any aspect or design described herein as "example" is not necessarily to be construed as preferred or advantageous over other aspects or designs. Rather, use of the word "example" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an implementation" or "one implementation" throughout is not intended to mean the same embodiment or implementation unless described as such.

Implementations of the systems, algorithms, methods, instructions, etc., described herein can be realized in hardware, software, or any combination thereof. The hardware can include, for example, computers, intellectual property (IP) cores, application-specific integrated circuits (ASICs), programmable logic arrays, optical processors, programmable logic controllers, microcode, microcontrollers, servers, microprocessors, digital signal processors, or any other suitable circuit. In the claims, the term "processor" should be understood as encompassing any of the foregoing hardware, either singly or in combination. The terms "signal" and "data" are used interchangeably.

As used herein, the term module can include a packaged functional hardware unit designed for use with other components, a set of instructions executable by a controller (e.g., a processor executing software or firmware), processing circuitry configured to perform a particular function, and a self-contained hardware or software component that interfaces with a larger system. For example, a module can include an application specific integrated circuit (ASIC), a Field Programmable Gate Array (FPGA), a circuit, digital logic circuit, an analog circuit, a combination of discrete circuits, gates, and other types of hardware or combination thereof. In other embodiments, a module can include memory that stores instructions executable by a controller to implement a feature of the module.

Further, in one aspect, for example, systems described herein can be implemented using a general-purpose computer or general-purpose processor with a computer program that, when executed, carries out any of the respective methods, algorithms, and/or instructions described herein. In addition, or alternatively, for example, a special purpose computer/processor can be utilized which can contain other hardware for carrying out any of the methods, algorithms, or instructions described herein.

Further, all or a portion of implementations of the present disclosure can take the form of a computer program product accessible from, for example, a computer-usable or computer-readable medium. A computer-usable or computer-readable medium can be any device that can, for example, tangibly contain, store, communicate, or transport the program for use by or in connection with any processor. The medium can be, for example, an electronic, magnetic, optical, electromagnetic, or a semiconductor device. Other suitable mediums are also available.

The above-described embodiments, implementations, and aspects have been described in order to allow easy understanding of the present invention and do not limit the present invention. On the contrary, the invention is intended to cover various modifications and equivalent arrangements included within the scope of the appended claims, which scope is to be accorded the broadest interpretation so as to encompass all such modifications and equivalent structure as is permitted under the law.

What is claimed is:

1. A method comprising:

receiving sensor data indicating location information of a user device, wherein the location information of the user device includes at least a distance between a microphone array and the user device and an angle of the user device relative to the microphone array;

receiving a first microphone signal generated based on a response of a first microphone in the microphone array to an acoustic stimulus and a non-acoustic stimulus;

receiving a second microphone signal generated based on a response of a second microphone in the microphone array to the acoustic stimulus and the non-acoustic stimulus;

generating a beamformed signal by combining the first microphone signal and the second microphone signal using differential beamforming;

adjusting the first microphone signal based on the distance between the microphone array and the user device and the angle of the user device relative to the microphone array;

adjusting the second microphone signal based on the distance between the microphone array and the user device and the angle of the user device relative to the microphone array;

generating a first compensated signal based on the adjusted first microphone signal;

generating a second compensated signal based on the adjusted second microphone signal;

generating an average signal corresponding to an average of the first compensated signal and the second compensated signal;

detecting a presence of the non-acoustic stimulus in the first compensated signal and the second compensated signal, by:

comparing a first signal to a second signal, wherein the first signal is at least one of the beamformed signal and a signal derived from the beamformed signal, and wherein the second signal is at least one of the average signal and a signal derived from the average signal; and determining, based on a result of the comparing, that an instantaneous magnitude of the first signal is greater than that of the second signal; and generating, responsive to the determining that the instantaneous magnitude of the first signal is greater than that of the second signal, an output audio signal by switching or cross fading between the beamformed signal and an alternative signal such that a contribution of the alternative signal to the output audio signal is increased and a contribution of the beamformed signal to the output audio signal is decreased.

2. The method of claim 1, wherein the adjusted first compensated signal and the adjusted second compensated signal are in phase with respect to the acoustic stimulus.

3. The method of claim 1, wherein the user device includes at least one of a key fob, a mobile computing device, a digital tag, and a smart card.

4. The method of claim 1, wherein the acoustic stimulus corresponds to speech of a user associated with the user device.

5. The method of claim 1, further comprising generating the first signal as a root mean square of the beamformed signal.

6. The method of claim 1, further comprising generating the second signal as a root mean square of the average signal.

7. The method of claim 1, further comprising:

determining repeatedly, at regular intervals, which of the first compensated signal and the second compensated signal has a lower instantaneous magnitude; and generating the alternative signal by crossfading between the first compensated signal and the second compensated signal such that whichever of the first compensated signal and the second compensated signal has the lower instantaneous magnitude at any particular interval is favored.

8. The method of claim 7, wherein determining which of the first compensated signal and the second compensated signal has the lower instantaneous magnitude comprises:

generating a first magnitude value by rectifying the first compensated signal;

generating a second magnitude value by rectifying the second compensated signal; and comparing the first magnitude value to the second magnitude value to identify which of the first compensated signal and the second compensated signal has a lower instantaneous magnitude.

9. The method of claim 7, further comprising determining that the first compensated signal has the least instantaneous magnitude among a set of compensated signals corresponding to each of the microphones in the microphone array.

10. The method of claim 7, wherein generating the alternative signal comprises:

switching or cross fading between the first compensated signal and the second compensated signal such that a contribution of the first compensated signal to an input of a low-pass filter is increased based on the first compensated signal having the lower instantaneous magnitude than the second compensated signal;

inputting the average signal to a high-pass filter; and summing an output of the low-pass filter with an output of the high-pass filter to generate the alternative signal.

11. The method of claim 1, wherein generating the alternative signal comprises switching to the first compensated signal such that the second compensated signal does not contribute to the alternative signal.

12. The method of claim 1, wherein the first compensated signal and the second compensated signal have equal magnitude and phase relationship to the acoustic stimulus.

13. The method of claim 1, wherein adjusting the first microphone signal includes adding a delay to the first microphone signal based on the location information of the user device.

14. The method of claim 1, wherein adjusting the second microphone signal includes adding a delay to the second microphone signal based on the location information of the user device.

15. A system comprising:

a processor; and a memory include instructions that, when executed by the processor, cause the processor to:

receive sensor data indicating location information of a user device wherein the location information of the user device includes at least a distance between a microphone array and the user device and an angle of the user device relative to the microphone array;

receive a first microphone signal generated based on a response of a first microphone in the microphone array to an acoustic stimulus and a non-acoustic stimulus;

receive a second microphone signal generated based on a response of a second microphone in the microphone array to the acoustic stimulus and the non-acoustic stimulus;

generate a beamformed signal by combining the first microphone signal and the second microphone signal using differential beamforming;

adjust the first microphone signal based on the distance between the microphone array and the user device and the angle of the user device relative to the microphone array;

adjust the second microphone signal based on the distance between the microphone array and the user device and the angle of the user device relative to the microphone array;

generate a first compensated signal based on the adjusted first microphone signal;

generate a second compensated signal based on the adjusted second microphone signal;

generate an average signal corresponding to an average of the first compensated signal and the second compensated signal;

detect a presence of the non-acoustic stimulus in the first compensated signal and the second compensated signal, by:

comparing a first signal to a second signal, wherein the first signal is at least one of the beamformed signal and a signal derived from the beamformed signal, and wherein the second signal is at least one of the average signal and a signal derived from the average signal; and determining, based on a result of the comparing, that an instantaneous magnitude of the first signal is greater than that of the second signal; and generate, responsive to the determining that the instantaneous magnitude of the first signal is greater than that of the second signal, an output audio signal by switching or cross fading between the beamformed signal and an alternative signal such that a contribution of the alternative signal to the output audio signal is increased and a contribution of the beamformed signal to the output audio signal is decreased.

16. The system of claim 15, wherein the user device includes at least one of a key fob, a mobile computing device, a digital tag, and a smart card, and wherein the acoustic stimulus corresponds to speech of a user associated with the user device.

17. The system of claim 15, wherein adjusting the first microphone signal includes adding a delay to the first microphone signal based on the location information of the user device, and adjusting the second microphone signal includes adding a delay to the second microphone signal based on the location information of the user device.

18. An apparatus that includes a memory containing instructions that, when executed by one or more processors of a computer, cause the one or more processors to:

receive sensor data indicating location information of a user device, wherein the location information of the user device includes at least a distance between a microphone array and the user device and an angle of the user device relative to the microphone array;

receive a first microphone signal generated based on a response of a first microphone in the microphone array to an acoustic stimulus;

receive a second microphone signal generated based on a response of a second microphone in the microphone array to the acoustic stimulus;

adjust the first microphone signal toward the user device, based on the distance between the microphone array and the user device and the angle of the user device relative to the microphone array;

adjust the second microphone signal toward the user device, based on the distance between the microphone array and the user device and the angle of the user device relative to the microphone array; and generate, using beamforming, a beamformed signal toward the user device by combining the adjusted first microphone signal and the adjusted second microphone signal.

* * * * *